(12) United States Patent
Bayne et al.

(10) Patent No.: US 7,584,976 B2
(45) Date of Patent: Sep. 8, 2009

(54) ERGONOMICALLY IMPROVED ROWING MOTION-PROPELLED CONVERTIBLE WHEELCHAIR USING RETRACTIBLE FIFTH WHEEL

(75) Inventors: Christopher J. Bayne, Los Gatos, CA (US); Stephen Barker, Sheridan, OR (US)

(73) Assignee: Christopher Bayne, Los Gatos, CA (US)

( * ) Notice: Subject to any disclaimer, the term of this patent is extended or adjusted under 35 U.S.C. 154(b) by 76 days.

(21) Appl. No.: 11/529,734

(22) Filed: Sep. 29, 2006

(65) Prior Publication Data

US 2007/0108721 A1 May 17, 2007

Related U.S. Application Data

(60) Provisional application No. 60/721,779, filed on Sep. 29, 2005.

(51) Int. Cl.
*B62M 1/14* (2006.01)
(52) U.S. Cl. ...................................... 280/244
(58) Field of Classification Search ................ 280/244
See application file for complete search history.

(56) References Cited

U.S. PATENT DOCUMENTS

| | | | |
|---|---|---|---|
| 2,518,642 A * | 8/1950 | Schneider | 280/245 |
| 4,119,163 A * | 10/1978 | Ball | 180/6.5 |
| 4,811,964 A | 3/1989 | Horn | |
| 5,020,815 A * | 6/1991 | Harris et al. | 280/246 |
| 5,167,168 A * | 12/1992 | Beumer | 74/810.1 |
| 5,244,051 A * | 9/1993 | Wu | 180/13 |
| 5,423,563 A * | 6/1995 | Wild | 280/250.1 |
| 5,607,171 A | 3/1997 | Labranche | |
| 5,632,499 A * | 5/1997 | Hutcherson et al. | 280/246 |
| 5,651,422 A * | 7/1997 | Casali | 180/13 |
| 6,234,504 B1 | 5/2001 | Taylor | |
| 6,247,715 B1 * | 6/2001 | Korosue | 280/242.1 |
| 6,530,445 B1 * | 3/2003 | Flowers et al. | 180/208 |
| 6,715,780 B2 * | 4/2004 | Schaeffer et al. | 280/248 |
| 6,742,797 B2 | 6/2004 | Lopez | |
| 6,764,089 B2 * | 7/2004 | Drymalski | 280/246 |
| 7,344,146 B2 * | 3/2008 | Taylor | 280/246 |

FOREIGN PATENT DOCUMENTS

WO    WO 8300432 A  *  2/1983

* cited by examiner

*Primary Examiner*—Tony H. Winner
(74) *Attorney, Agent, or Firm*—Dort Patent, P.C.; David B. Dort

(57) ABSTRACT

The Trike's unique power source is provided by a rowing-type motion of the user rather than the less efficient "hand rim" grip or wrist propulsion. The rowing motion significantly reduces the chances for repetitive stress injuries, like carpal tunnel. Furthermore, the rowing motion and movements, are designed to facilitate efficient propulsion and steering in combination, to be effected simultaneously. The rowing motion allows the user's full arm strength and full range of motion to assist in the powering of the vehicle. The wheelchair also has a retractable fifth or propulsion wheel that allows the chair to be used in a confined space without sacrificing performance.

18 Claims, 35 Drawing Sheets

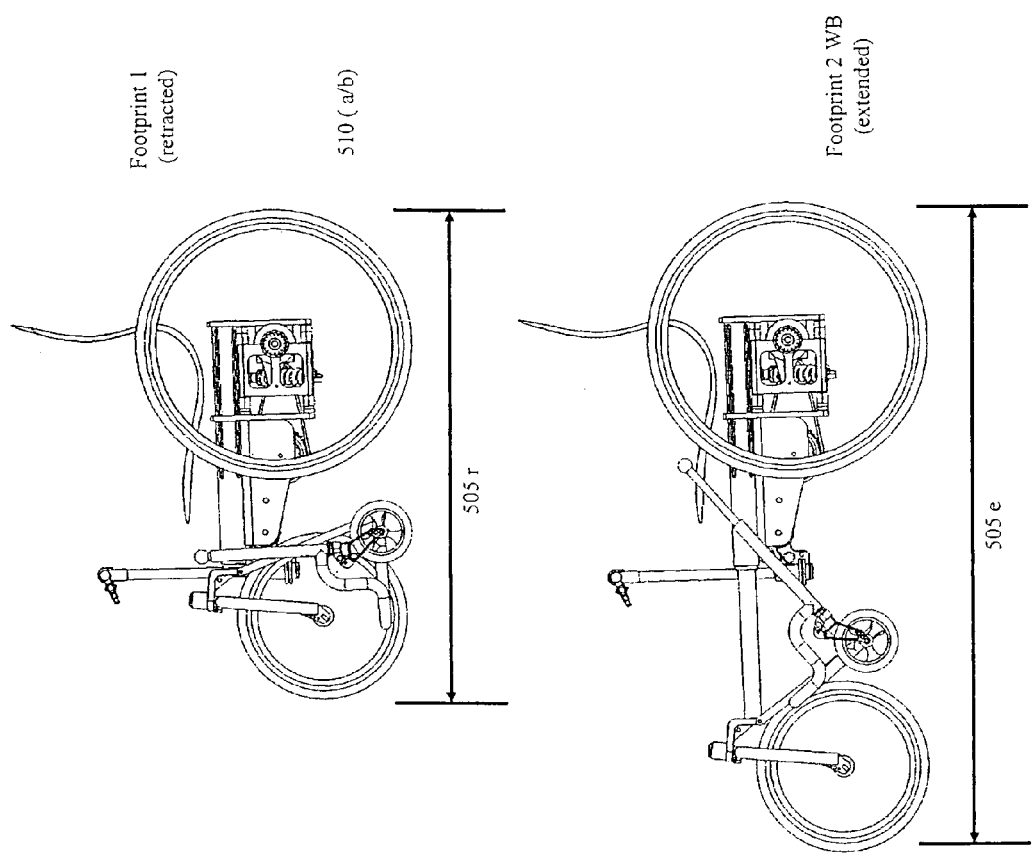

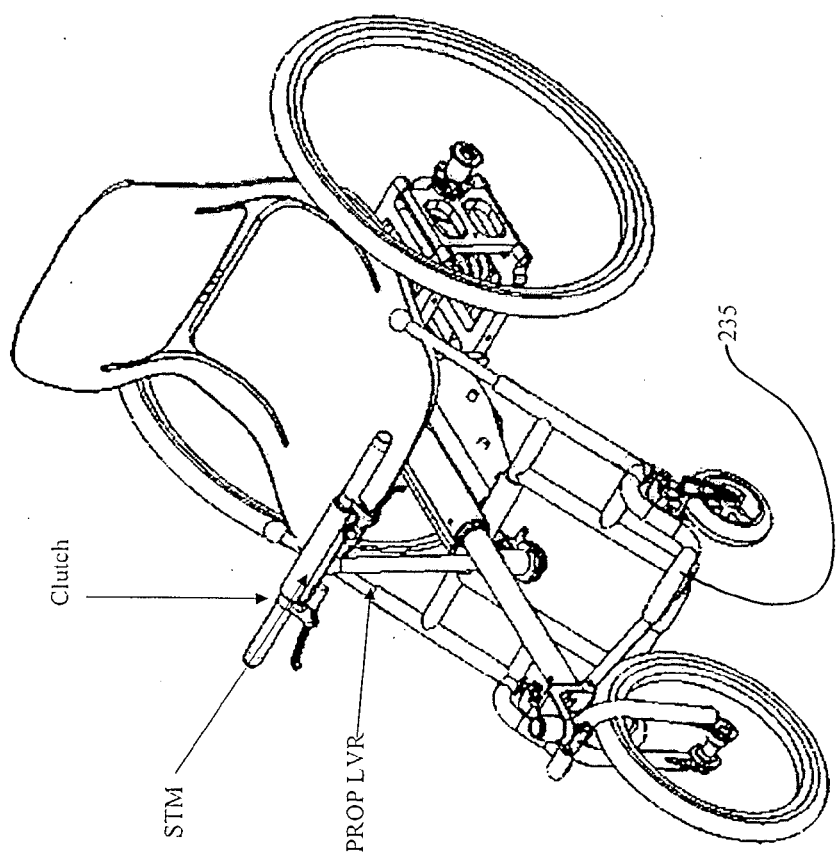

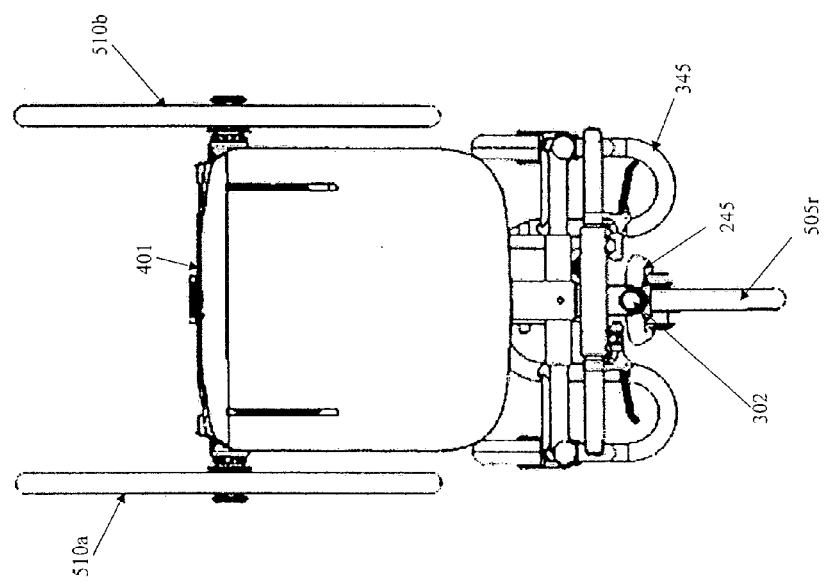

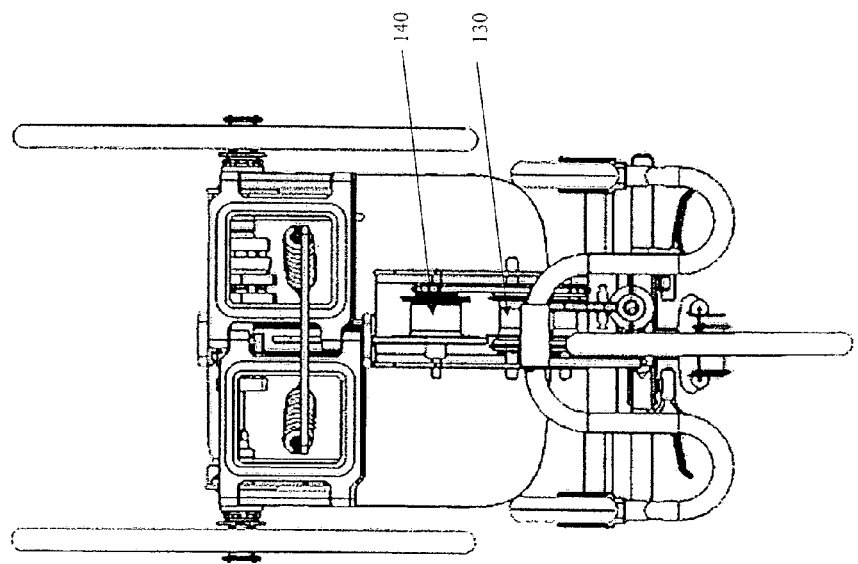

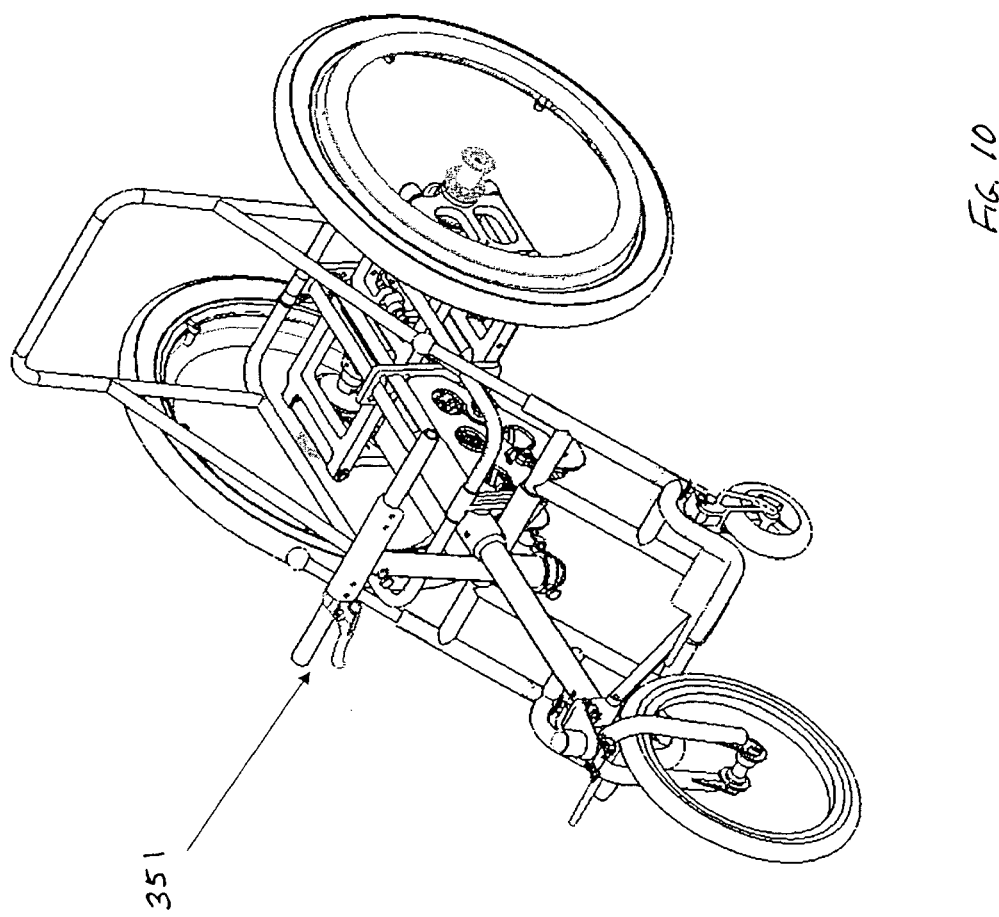

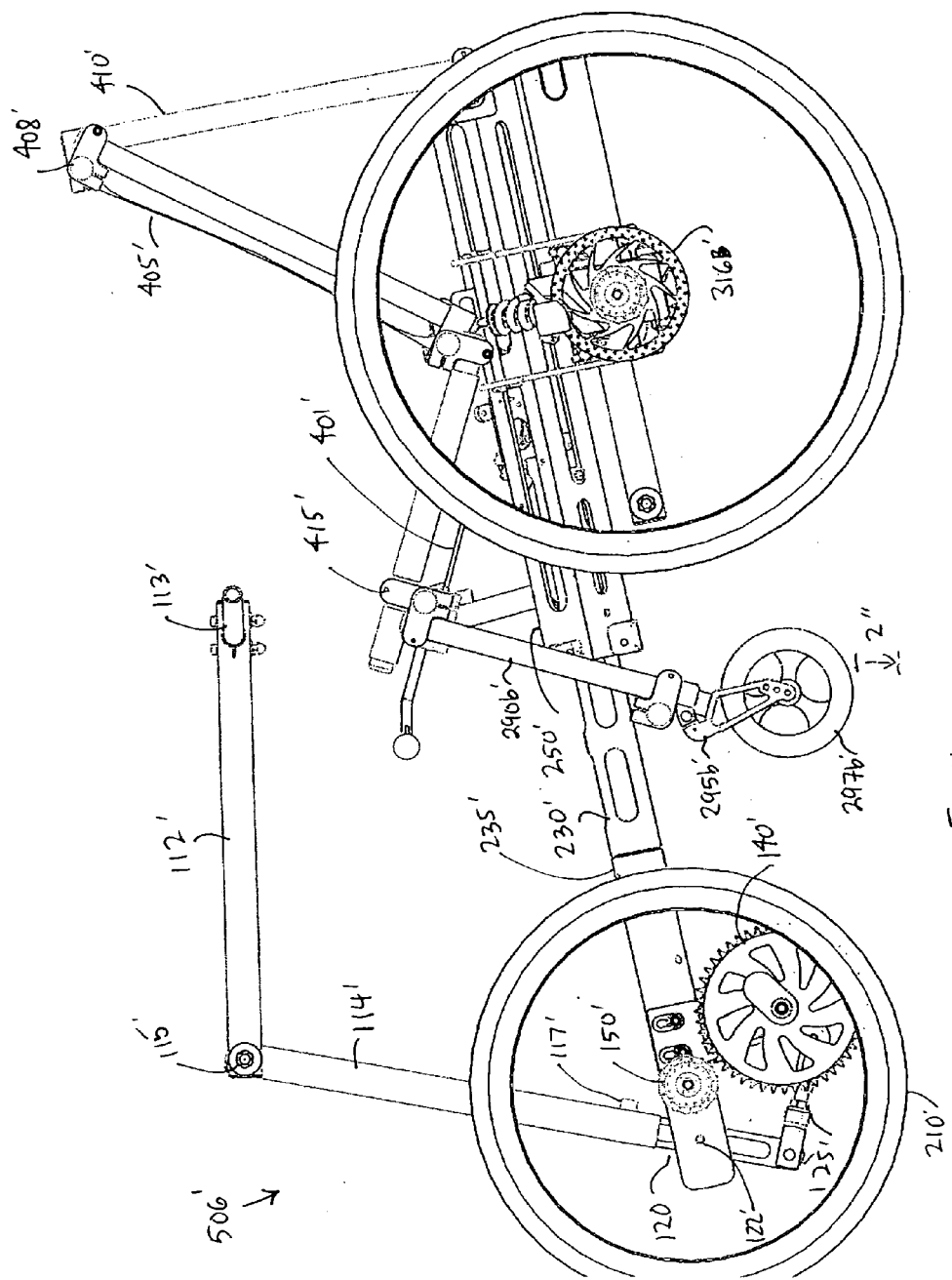

ERGONOMICALLY IMPROVED ROWING MOTION-PROPELLED CONVERTIBLE WHEELCHAIR USING RETRACTIBLE FIFTH WHEEL

REFERENCE TO PRIORITY DOCUMENTS

This Application claims priority under 35 USC §119(e) and all other applicable US and International laws to 60/721,779 to US Application, filed Sep. 29, 2005 and entitled ERGONOMICALLY IMPROVED ROWING MOTION PROPELLED CONVERTIBLE WHEELCHAIR USING RETRACTIBLE FIFTH WHEEL, which is incorporated by reference for all purposes.

BACKGROUND

Many of the existing hand-propelled wheelchairs designed for improved power efficiency do not account for certain repetitive motion injuries that are particularly problematic for the wheelchair-bound population. While power may be the focus of these devices, the potential damage to even the most hearty of those who use such devices is catastrophic to the mobility of the wheelchair-bound, should injuries even as innocuous as tendonitis. Such injuries are often overlooked in wheelchair design, because they are not so devastating to the mobility of an able-bodied person.

Furthermore, wheelchairs designed for high-speed use, may not account for the day-to-day needs of the wheelchair-bound individual either with regard to comfort, ease of use, or maneuverability in small spaces such as restrooms, common carriers, and commercial offices. Thus, generally the more rugged or powerful the wheelchair, the less appropriate it is for convenient everyday use. Other vehicles, such as U.S. Pat. No. 6,352,274 (which is incorporated by reference for all purposes) to Brian Redman may be designed for certain-aspects of human-powered mechanical efficiency, but do not address the needs of the disabled, such as use in a confined space, and are therefore not appropriate for adaptation for use in a wheelchair.

A regular wheelchair with only "hand rim" propulsion provides no mechanical advantage (MA) and are therefore it is hard work to propel long distances, and especially difficult up hill. It is also has the disadvantage that power is interrupted and energy is wasted every time the hand rim is gripped and released because the mechanism is not continuous. For many wheelchair users, to propel over long distances can be strenuous and stressful on the shoulders and wrists. Hand cycles are limited mainly to outdoor use because they lack maneuverability.

SUMMARY OF THE INVENTION

The present invention, the TRIKE™, solves many of the problems for the wheelchair bound individual who wants an ergonomically sensible, convenient, yet powerful and stable wheelchair. The Trike's unique power source is provided by a rowing-type motion of the user rather than the less efficient "hand rim" grip or wrist propulsion. The rowing motion significantly reduces the chances for repetitive stress injuries, like carpal tunnel. Furthermore, the rowing motion and rowing movements, are designed to facilitate efficient propulsion and steering in combination, to be effected simultaneously. The rowing motion allows the user's full arm strength and various range(s) of motion to assist in the powering of the vehicle. Other advantages of the present invention are included in table 1 below:

TABLE 1

Main Features and Benefits summary of the "Trike"

| Feature | Benefit |
| --- | --- |
| Transformable | Versatility for road and indoors (5 ft turning radius in cycle mode/360° on the spot rotation in wheelchair mode) |
| Mechanical Advantage | Increased propulsion, power or speed compared to "Hand Cranking" or inverted peddle cycle. |
| Biomechanical Efficiency | Rowing action capitalizes upon the increased range of motion and ability of the whole upper body to deliver power as well as pulling and pushing. |
| Tilting Suspension | Maintains low center of gravity (C of G) for cornering, 20" Seat Height for ease of transfer and safety, comfort springing |
| Quality | The highest engineering standards and quality components are used to ensure maximum performance and reliability |
| Healthy Manufacturing | Reduced risk of stress related and/or repetitive injuries compared to "hand rim" propulsion |
| Simplicity | In particular embodiments of the invention, many parts may be supplied by bicycle and other vehicle component manufactures. |

The propulsion system of the present invention is only one of the many innovative features that allow the user to convert the vehicle from a high-performance tricycle with improved center of gravity to highly-versatile wheelchair for everyday use. For example, the TRIKE™ may be converted, on the fly, from a three-wheeled vehicle to a more conventional four-wheeled chair with the power (rowing) handle stored in the interior of the chair with a retractable third wheel.

The "Trike" uses a rowing type action which is bio-mechanically better and does provide significant Mechanical Advantage (see calculations below). It also has a cyclical mechanism which lends itself to gearing. Cyclical mechanisms are "low impact" and therefore reduced risk of injury to joints and ligaments.

The present invention is a hand propelled vehicle which quickly and easily "transforms" from TriCycle Mode (extended) into Wheelchair Mode (retracted). It also provides a significant "mechanical advantage" which means that the rider can enjoy traveling quickly and easily over considerable distances. Then upon reaching their destination and while remaining comfortably seated, can convert to wheelchair mode for the essential maneuverability inside a building, restroom, office or home "Trike" performs these functions all in the same vehicle with no need to transfer.

Although the present invention retains the "hand rim propulsion" as a secondary means of propulsion because of its maneuverability in confined spaces, its primary motive power is provided by the rider with a "rowing motion" with what's called the "Power Steering" assembly. The "rowing motion" is a more natural and is bio-mechanically more efficient, regardless of the rider's size and strength. The other big advantage of the rowing style is the "range of motion" which lends itself ideally to exploitation of mechanical advantage afforded by the basic simple lever principle The present invention has suspension that "tilts" into the corners, like a regular bicycle. This means that unlike a "tricycle" the rear wheels remain parallel, reducing rolling resistance and tire wear. The tilting suspension also means that stability is maintained at the regular seat height of 20" which facilitates ease of "transfer" and increased visibility for and of the rider.

The present invention may be used for exercise to maintain cardiovascular fitness which is essential to good health and well being and is particularly important for wheelchair users, since a user is able to combine exercise with the mobility needs. For this reason the present invention combines the bio-mechanical efficiency with simple mechanical advantage resulting in easier propulsion with versatility and practicality to provide the rider with fun, exercise and convenience combined.

Embodiments of present invention may be configured to different end uses in various models will become available to suit many different types of users. For example, for the rider who wants the "Deluxe" version there may be a 7-speed (or higher) speed gearing and all the optional extras included; for the everyday user the "Standard" version is made without gearing and reasonably light weight; for the enthusiast, who just wants to go very fast, the light weight model which does not transform to "wheelchair configuration".

BRIEF DESCRIPTION OF THE DRAWINGS

FIG. 1B illustrates the linear footprint of the retractable and extendible modes;

FIG. 4B illustrates a first embodiment of the invention in a retracted mode from a top view;

FIG. 4C illustrates a first embodiment of the invention in a retracted mode from an underside view;

FIG. 10 illustrates how a brake may operate in an embodiment;

FIG. 11B shows the second embodiment of the invention from a side view;

DETAILED DESCRIPTION OF THE DRAWINGS

Figure 1A:
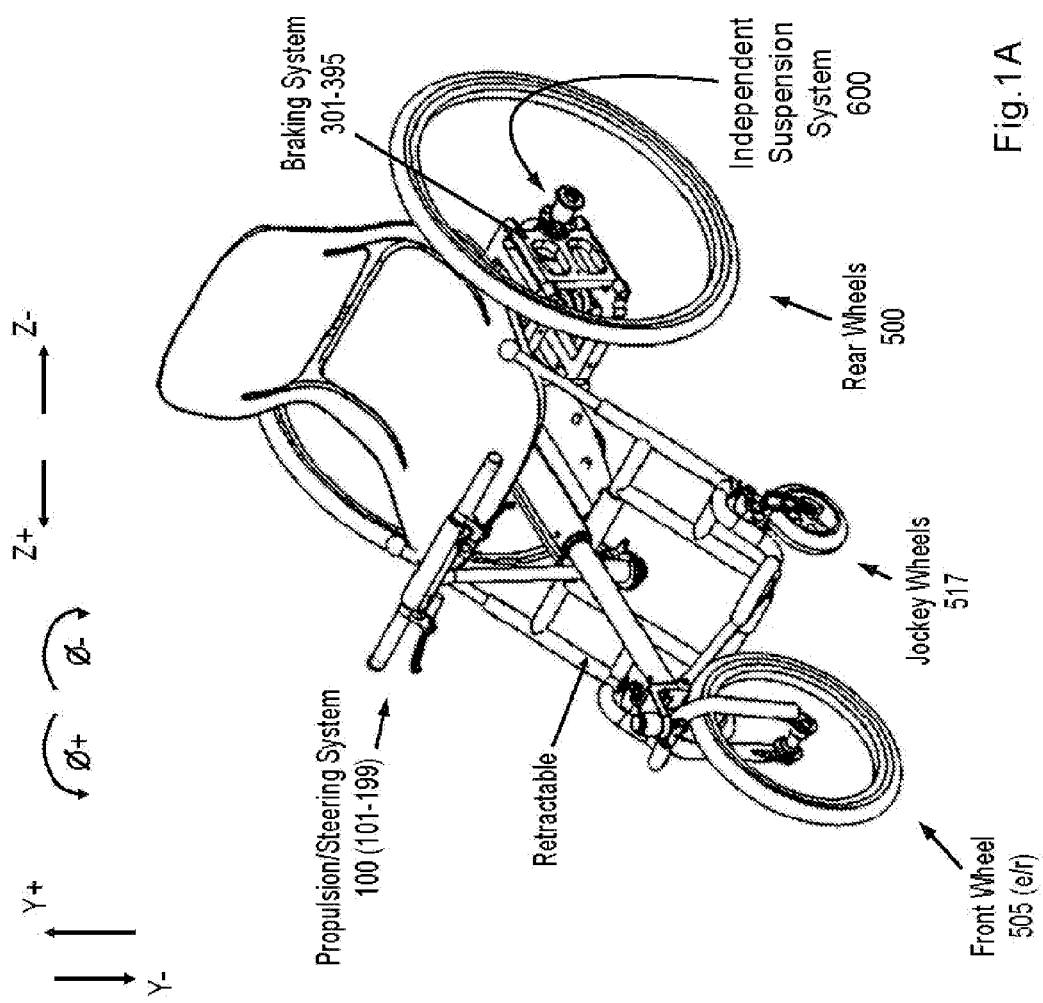
FIG. 1A illustrates in the component systems of particular embodiments of the invention.

FIGS. 1A and 1B illustrate general conceptual groups of the components systems of several configurations of the present invention as it may be understood in terms of "systems."

I. Propulsion System 100 (indices 101-199)

| Part title/description | Reference No. |
|---|---|
| Handlebar | 113 |
| T-bar | 112 |
| First Prop Elbow | 115 |
| Second Prop Elbow | 117 |
| Gear System | 101 (see FIG. 6a-6d) |
| Protective Gear Covers | 998 |
| $1^{st}$ Gear | 120 |
| First Axle | 120(ax) |
| Drive Chain 1 (connects gears 1-2) | 122 |
| Drive Chain 2 (Connects gears 1-3) | 124 |
| Drive Chain 3 (connects gears 2-3) | 126 |
| Gear | 130 |
| Second Axle | 130(ax) |
| Main Gearing (7-speed hub gear) | 140 |
| Output sprocket | 145 |
| Drive Chain | 155 |
| Differential Gear | 160a/b |
| II. Frame and retractable telescope and supports | 200 (201-299) |
| IIA. Telescoping tube | 230 |
| Inner telescoping part | 230(i) |
| Outer telescoping part | 230(o) |
| Locking pin | 232 |
| IIB. Frames from retractable wheels | 235 |
| Jockey H frame | |
| Jockey H frame foot rest 235 | 235(fr) |
| III. Steering and Braking systems | 300 (301-399) |
| IIIA: Steering | 301-349 |
| Cable | 301 |
| Steering knuckle | 302 |
| Cable Guide | 305 |
| Steering halo | 307 |
| Cable guide | 305 |
| IIIB Braking | 350-399 |
| Braking handle | 351 |
| Bearing brakes | 355 |
| Braking cable (not shown) | 353 |
| IV Seat and sitting features | 400 (indices 401-499); |
| V. Wheels | 500 (indices 501-599) |
| Front wheel extended | 505(e) |
| Front wheel retracted | 505(r) |
| Front wheel axle | 505(ax) |
| Rear wheels | 510(a/b) |
| Rear wheel axles | 510(a)(ax)/510(b)(ax) |
| Quick-release hubs | 512(a/b) |

-continued

| Part title/description | Reference No. |
| --- | --- |
| Drive shafts) | 515(a/b) |
| Jockey wheels and | 597(a/b) |
| brackets | 595 (a/b) |
| VI Shocks and Suspension | 600 (indices 601-699) |
| Shocks | 620 |
| Independent suspension a frame | 602/605(a/b) |

Each one of the "systems" includes features that may be understood by skilled artisans to have its own innovative implementations that are independent of embodiments of the hand-propelled vehicle as a whole. Thus, skilled artisans should understand that not only does the TRIKE™ contain innovative features as a whole, but includes innovative components and configurations that may be applied to other human-powered vehicles or even partially human-powered vehicles. For example, the telescoping support frame may be thought of as an invention that may be applied to conventional wheelchairs as well as the hand-propelled vehicles discussed herein.

Figure 1C:
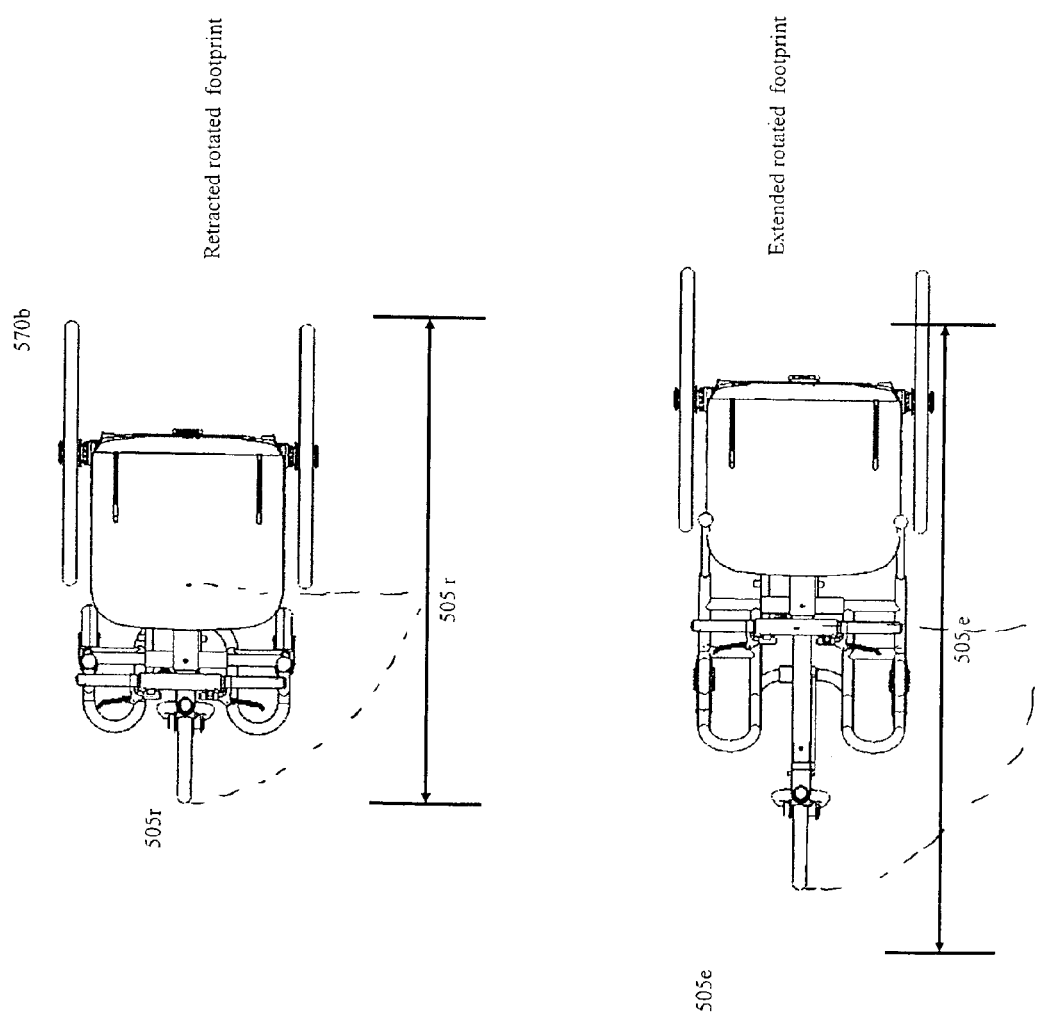
FIG. 1C illustrates the "rotational footprint" of the retractable and extendible modes.

FIG. 1B illustrates the benefit of the retractable and extension feature of the hand-propelled vehicle from a linear or "wheelbase" perspective. Although, once again, the retractable/extendible feature should be thought of as both part of the hand-propelled vehicle and as an application that may be applied to conventional wheelchairs as well. FIG. 1C illustrates the advantage of having the "rotational" footprint, as wheelchairs need to operate in three-dimensional space, and the ability of a wheelchair user to reduce the rotational footprint in a small space by converting from the extended "travel" mode to the indoor "retracted" mode provides for a great degree of versatility for the wheelchair bound individual.

Figure 2A:
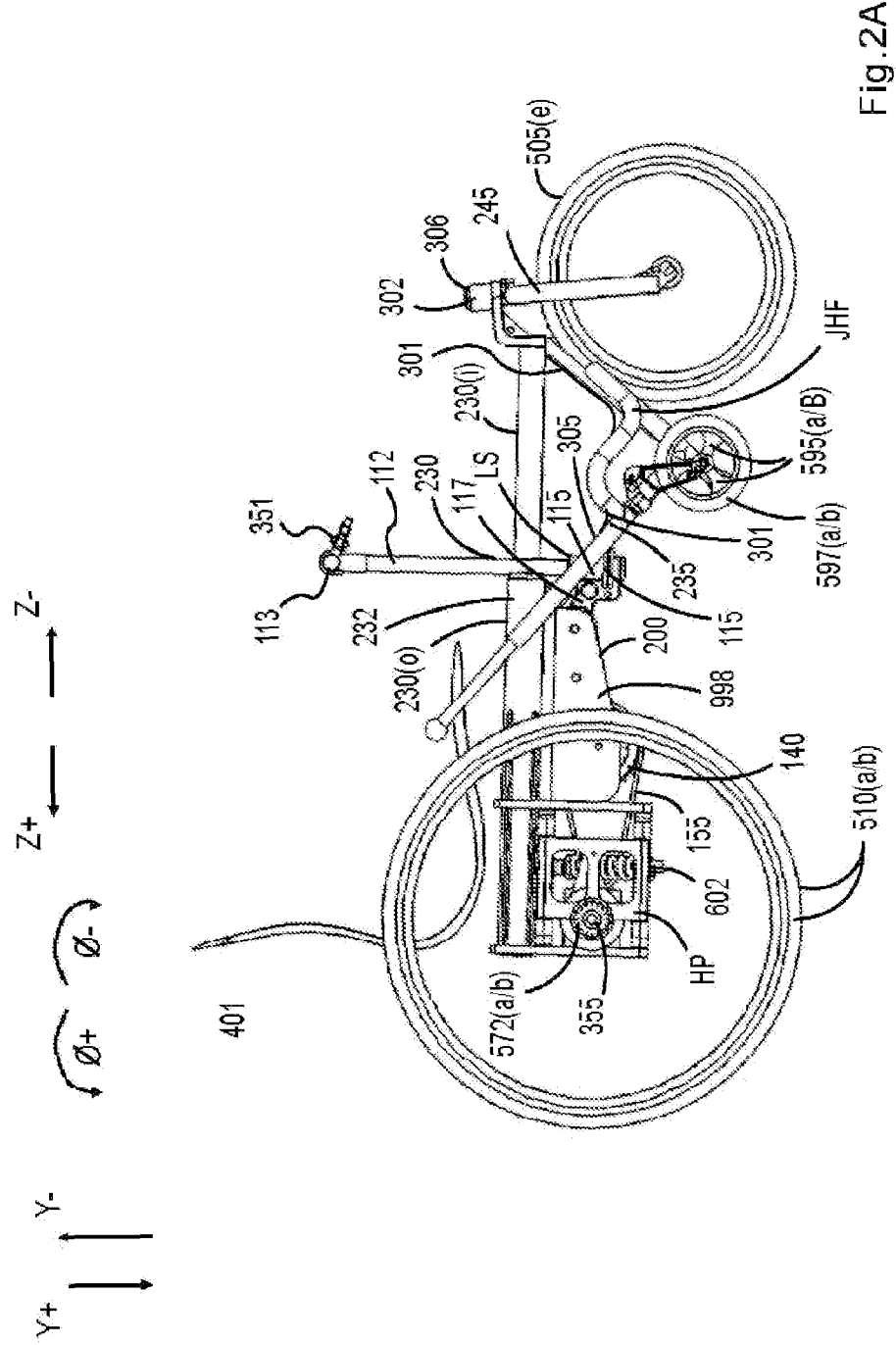
FIG. 2A illustrates a first embodiment of the invention in extended mode from a side view.
Figure 2B:
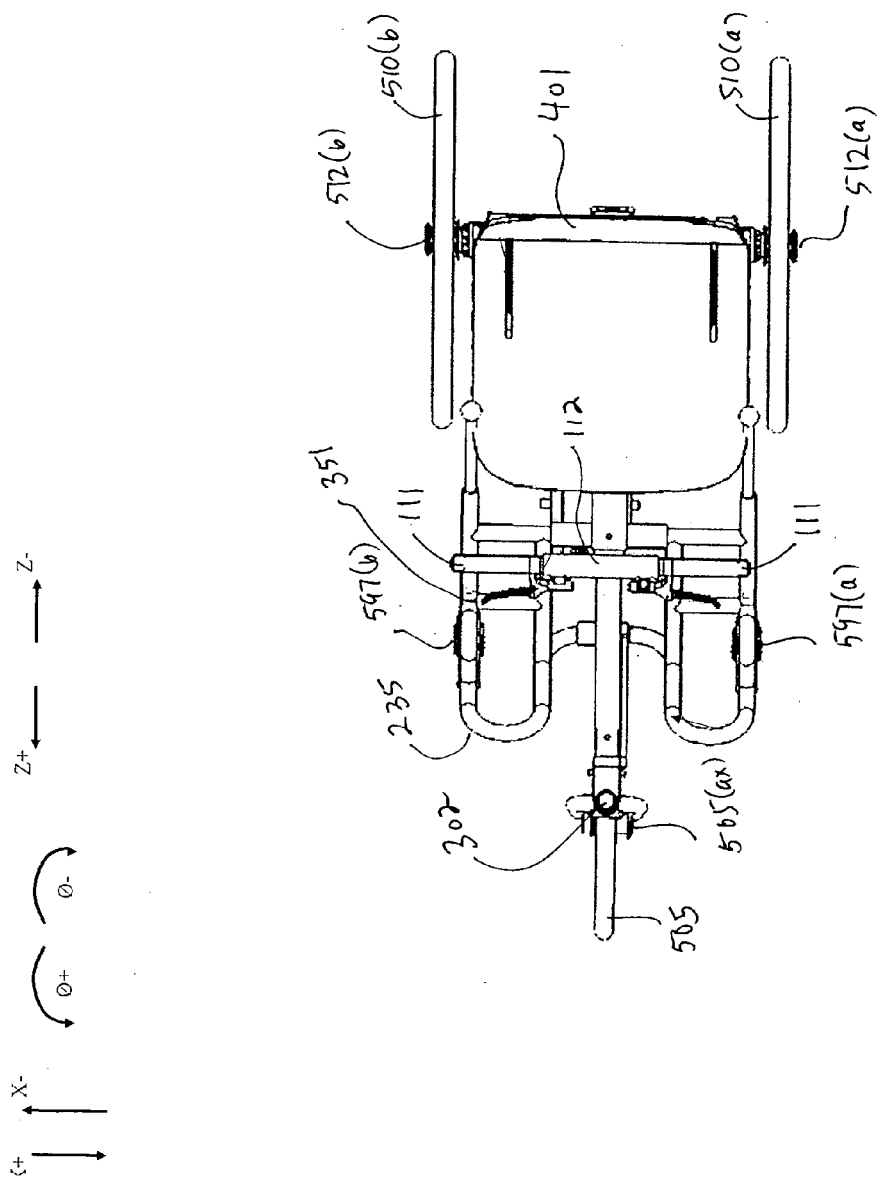
FIG. 2B illustrates a first embodiment of the invention in extended mode from a top view.
Figure 2C:
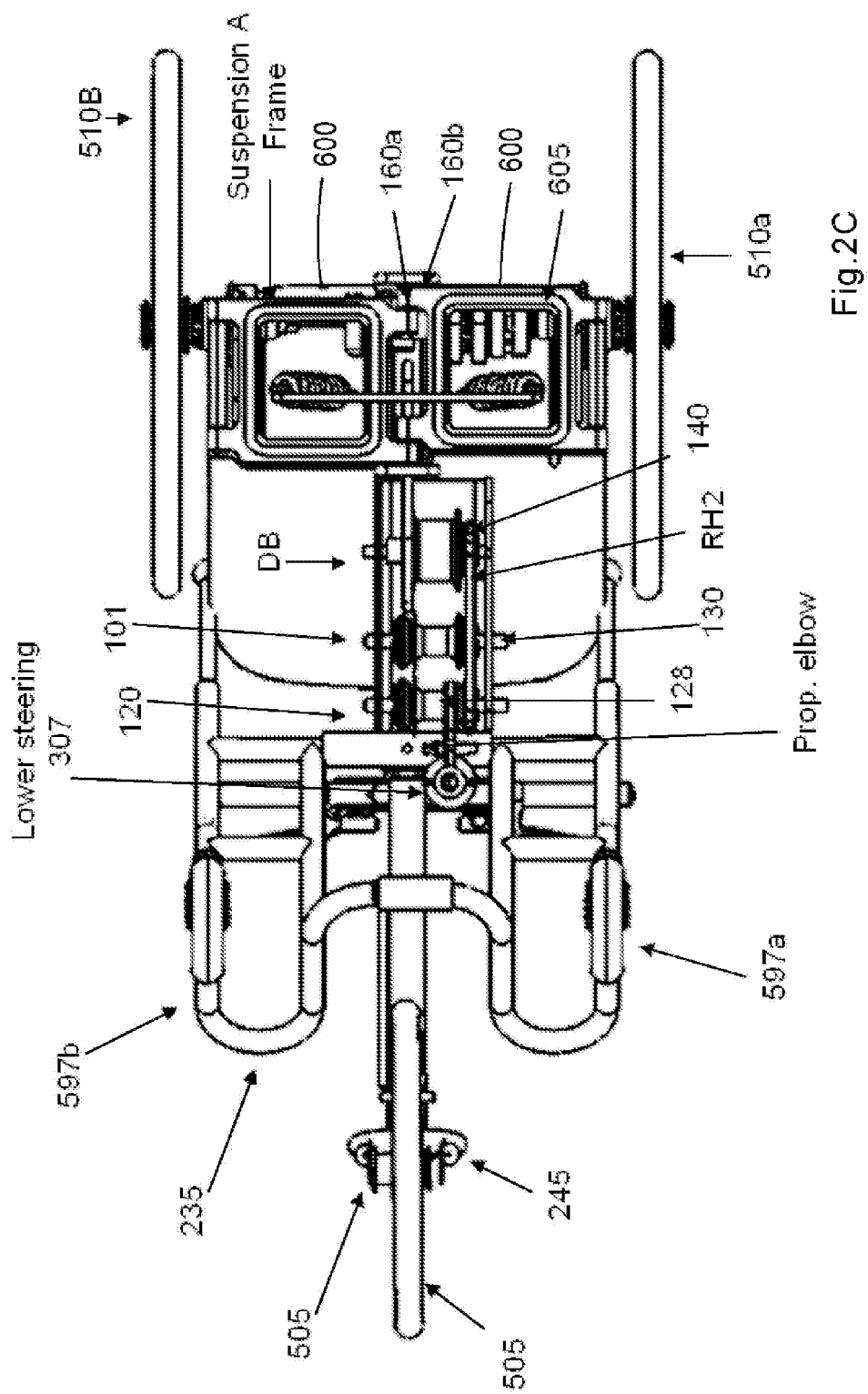
FIG. 2C illustrates a first embodiment of the invention in extended mode from an underside view.

Referring now to FIGS. 2A-2C, side, top and underside views of the 'extended' mode of a first embodiment of the invention are shown. FIGS. 2a-2c illustrate the first embodiment from side, top and underside views respectively in an "extended" mode. The "retracted" mode of the first embodiment is shown in FIGS. 4a-5c below. The convertible hand-propelled wheelchair is supported on a frame system 200, of which the primary structure is a telescoping support tube or frame 230, that has an outer portion 230(o) and an inner portion 230(i), which is "lockable" in either an extended or retracted position by a pin 232, which can take a variety of securing structures without departing from the scope of the invention. The telescoping support tube 230, supports a jockey frame, or jockey H frame 235 is configured such that it supports the jockeys wheels (597(a)/b) when the hand-propelled vehicle is in a retracted mode, and allows the user to rest their feet comfortably the vehicle is in an extended position. The telescoping support tube 230 also provides structural support for the fifth wheel forks 245 which operatively support the front or fifth wheel 505(e) and its axle 505(ax).

FIGS. 2a-2c illustrate the innovative hand-propelled propulsion system 100 in the first embodiment. A handle bar 113, designed for easy gripping moves a "t-bar" or t-handle 112 propulsion lever or drive. The t-handle 112 moves forward and backward (indicated by z+ (front of the trike) and z− (rear of the trike)) with a slight arc (indicated by the theta + or theta −,), but can vary based on the needs of the end user. The t-handle moves a first prop elbow 115, that also serves as a steering rotation around a plane. A cable 301 which extends from cable link structure 305 allows the t-handle 112 to turn the front wheel 505(e) at the steering knuckle 302. A two-way gear system 101 include a three gear configuration that allows the propulsion handle 112 to create forward motion by both the pushing and pulling motion.

FIG. 2b shows a top view of the extended first embodiment, illustrates how a user turns the handle bars 113, so that the t-bar 112 is moved around an axis formed by the XZ plane (the rotations indicated by a phi(+) phi(−)) to steer the first embodiment of the hand-propelled. The cable guide 305 allows a standard bicycle cable to steer the fifth wheel 505(e).

Figure 2E:
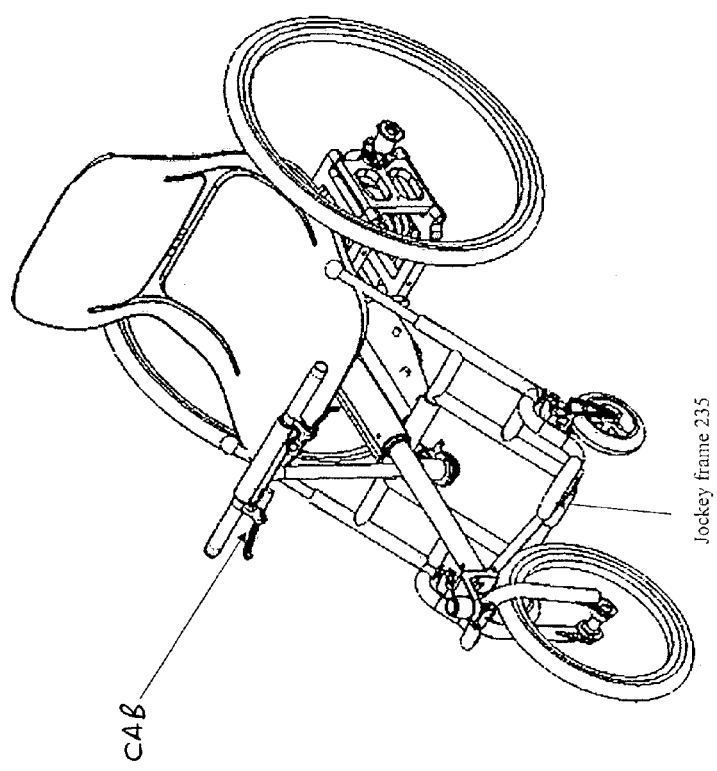
FIG. 2D illustrates a first embodiment from angled top view.

FIG. 2c illustrates the underside of the first embodiment, which more clearly details the gear system of the propulsion system 101. The second prop elbow 117 drives the first gear 120 when the propulsion handle 112 is moved both forward and backward. The propulsion system is discussed further in FIGS. 6a-d below. FIGS. 2d and 2e provide additional views of a first embodiment in an extended position.

Figure 3A:
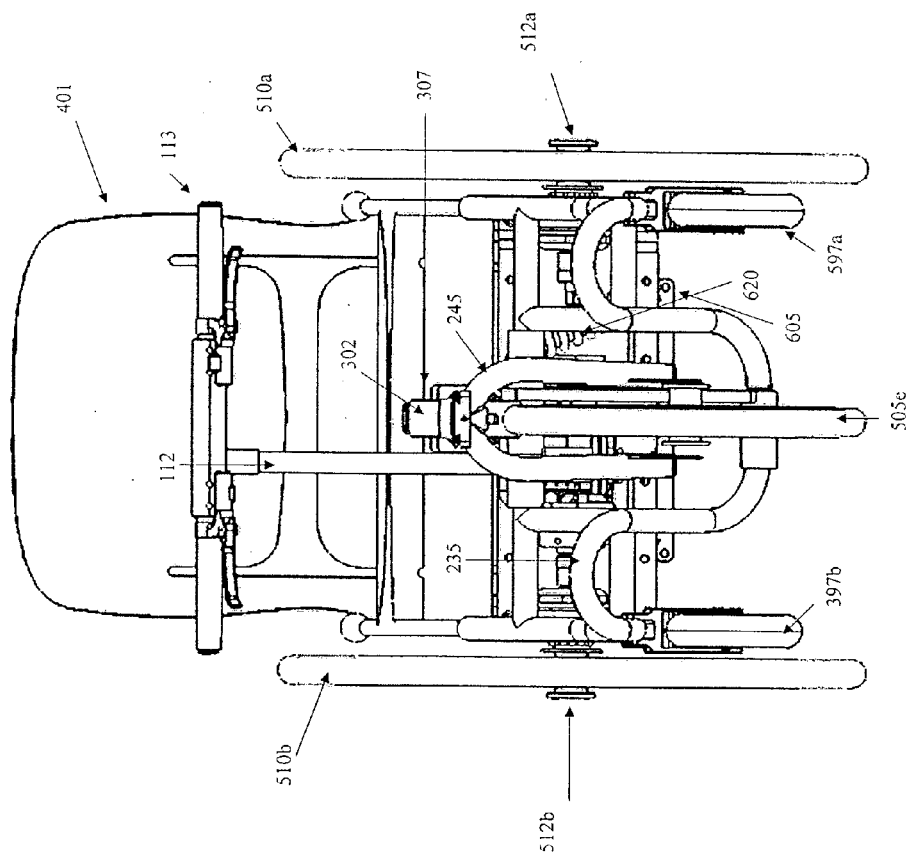
FIG. 3A illustrates a first embodiment of the invention in extended mode from the front view.

FIG. 3A provides a front view of a first embodiment in an extended position. In FIG. 3a, it is clear that the jockey wheels 597(a/b) are off the surface of the ground a few inches. Additionally the steering knuckle 302 for the fifth retractable wheel can be seen. There may be several mechanisms by which the TRIKE may be efficiently and safely turned along the fifth wheel pivot 307.

Figure 3B:
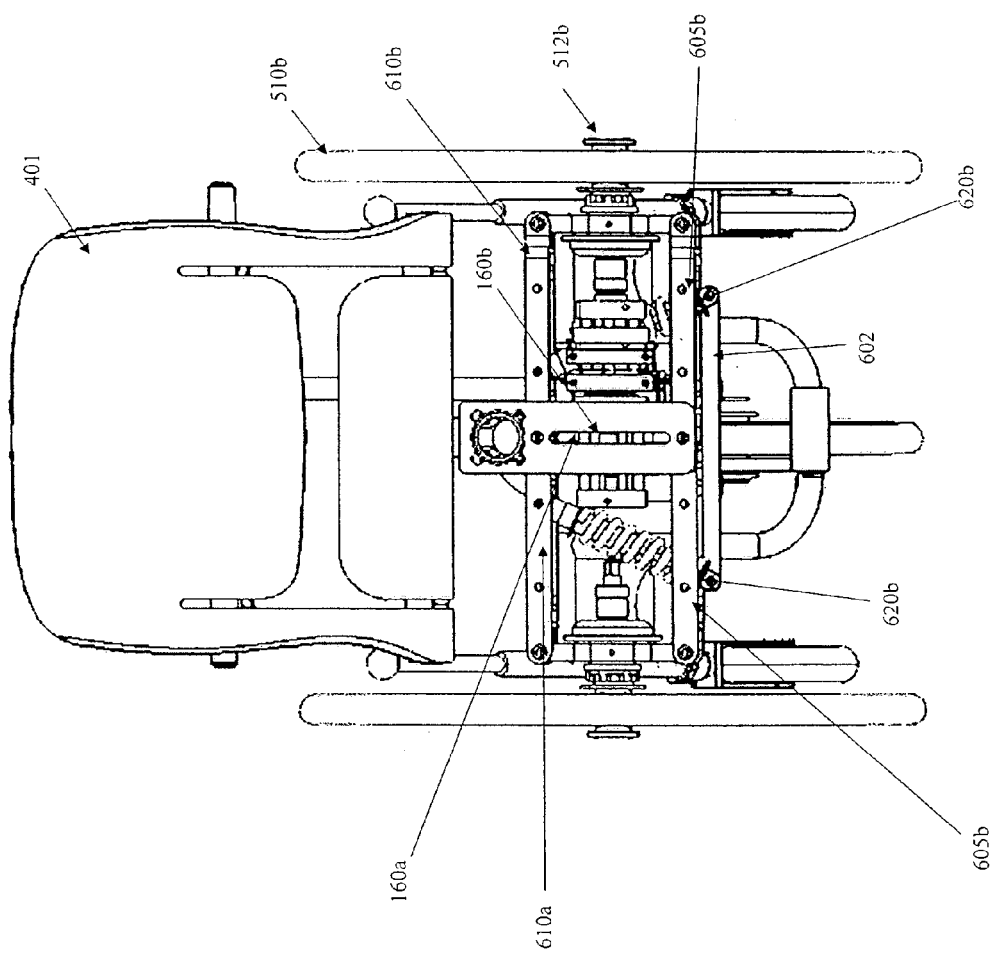
FIG. 3B illustrates a first embodiment of the invention in extended mode from the rear view.

FIG. 3b provides a rear view of the first embodiment of the invention and many of the suspension and support features can be seen. The independent suspension system 600 and the differential gearing 160a/b allow for the hand-propelled vehicle to be safely used in high-performance racing and made with standardized parts. The shocks 620 also provide the rider with additional safety and comfort. The independent wheel suspension is also detailed in FIGS. 8a-d below.

Figure 4A:
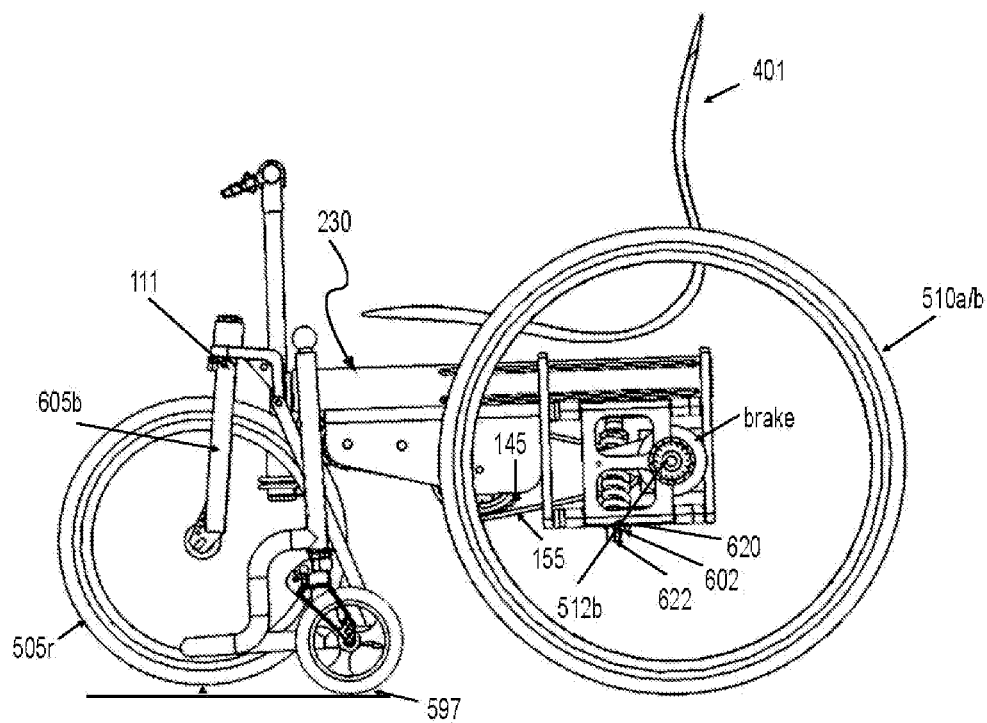
FIG. 4A illustrates a first embodiment of the invention in a retracted mode from a side view.
Figure 5A:
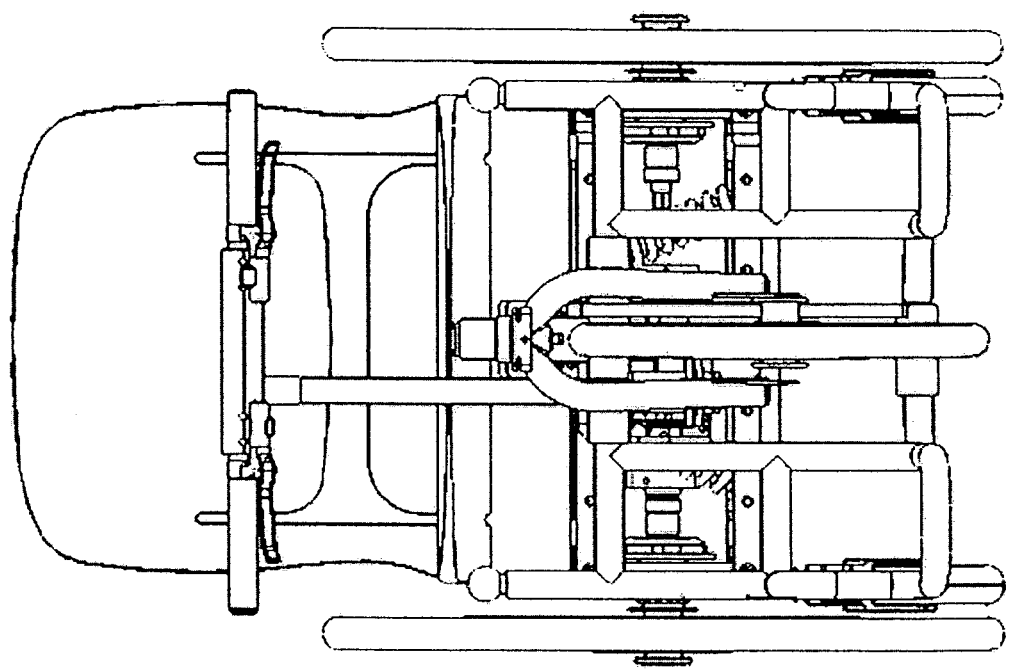
FIG. 5A illustrates a first embodiment of the invention in a retracted mode from a front view.
Figure 5B:
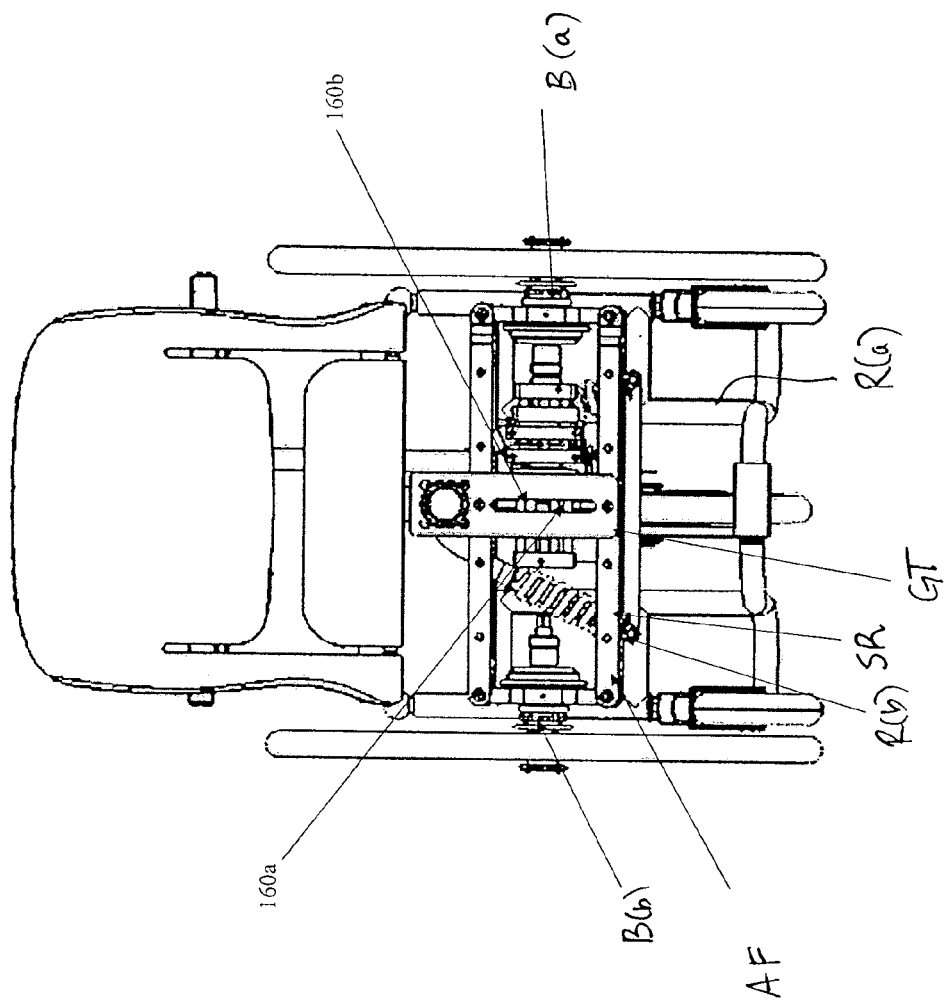
FIG. 5B illustrates a first embodiment of the invention in a retracted mode from a rear view.

FIG. 4a illustrates a first embodiment of the hand-propelled vehicle in a retracted mode. The jockey wheels 597(a/b)(down) touch the surface of the ground, and the fifth wheel is raised 505(r) a few inches off of the ground. The folding part 111 of the handlebar 113 folds into the t-bar 112, so that there is nothing in front of the wheelchair user. FIG. 4b illustrates a top view of the retracted mode of a first embodiment. FIG. 5A provides a front view of the retracted mode of the first embodiment and FIG. 5b provides a rear view of the retracted first embodiment.

Figure 6A:
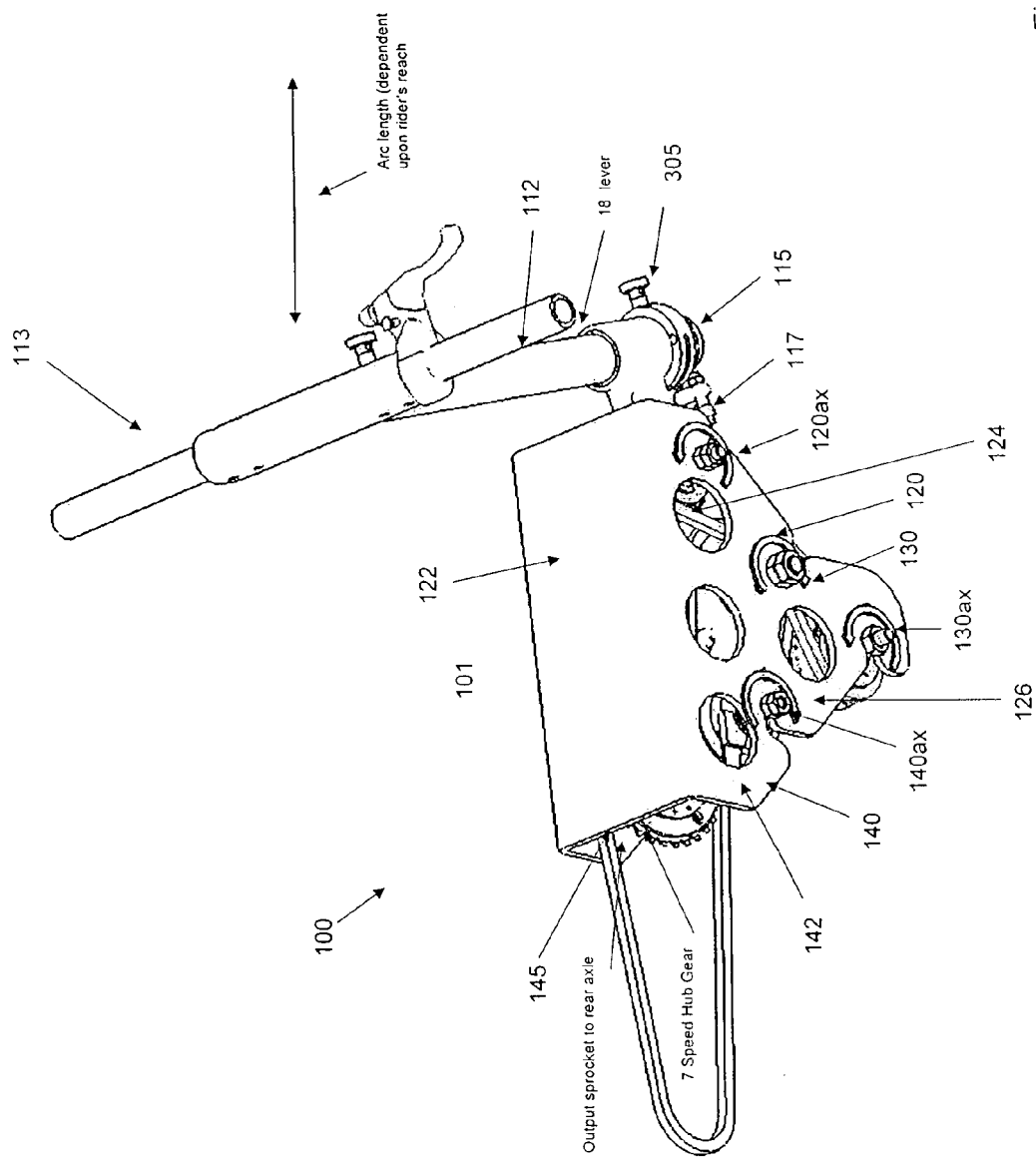
FIG. 6A illustrates the details of a propulsion system.
Figure 6B:
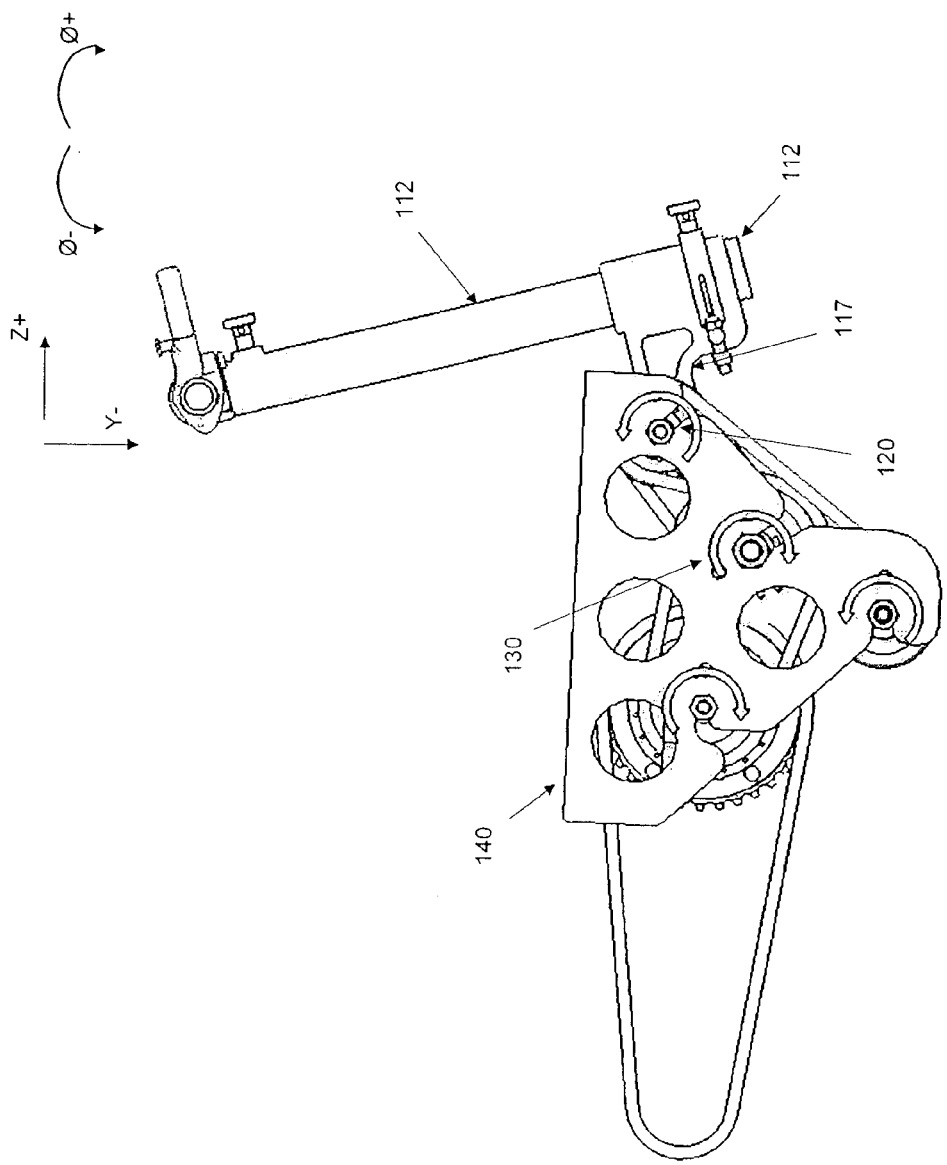
FIG. 6B illustrates magnified details of the propulsion system.
Figure 6C:
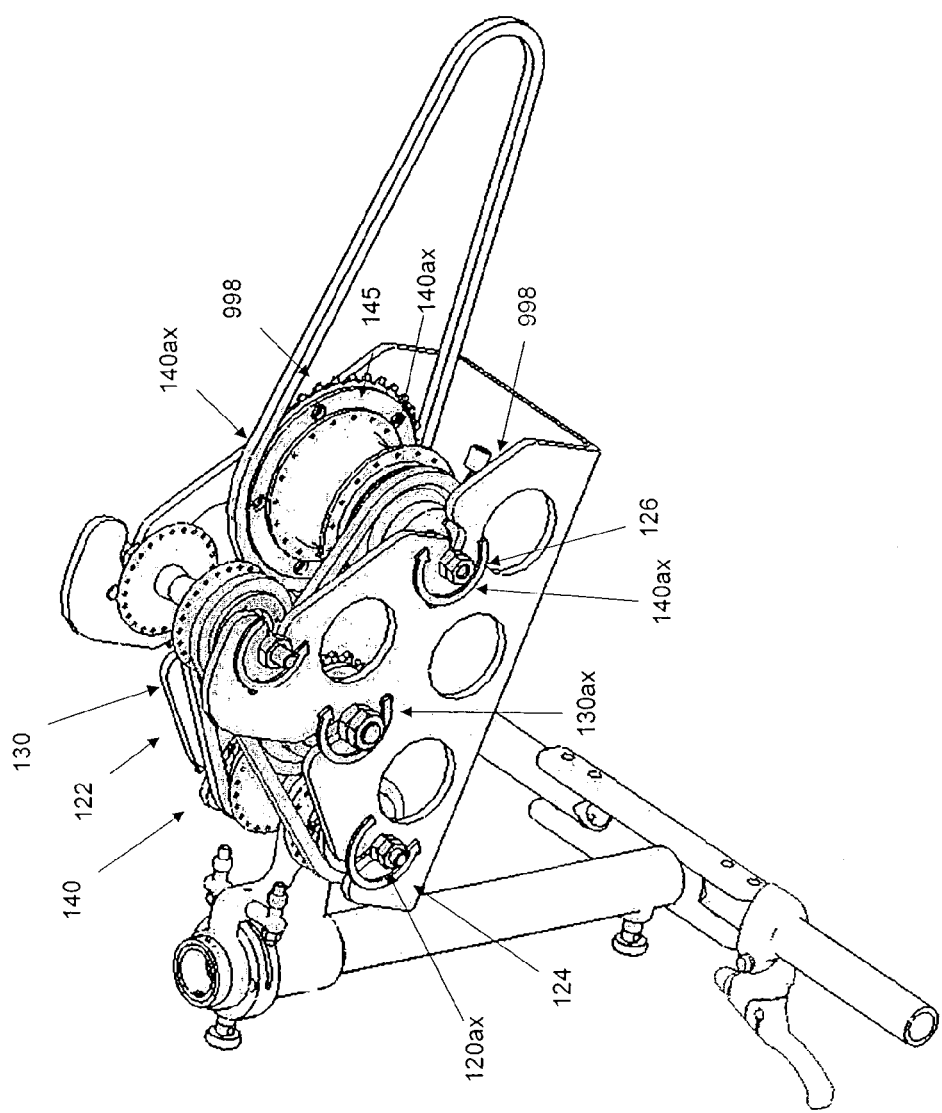
FIG. 6C illustrates the details of the propulsion system or drive from the underside.

Referring now to FIGS. 6A-6C, a propulsion or drive system 100 is shown in a first embodiment from top angle, side and underside views. The propulsion system 100 allows the TRIKE to be powered by the rider by moving the propulsion handle in both the forward rotation θ(+) and the reverse rotation θ(−). The "rotation" is not a pure circular "arc" but rather an ergonomically designed movement in both the x and y planes that will resemble a natural "rowing motion." Although, in certain embodiments, pure linear (Z+/−) may be more desirable for certain aspects of physical therapy (such as arm or elbow rehabilitation) rather than ergonomic advantages. Thus, skilled artisans should understand that different motions of the hand-propulsion drive may be used without departing from the spirit and scope of the invention. The t-handle 112 drives the vehicle forward by moving the prop elbows 115/117 which move the free wheels on the first gear 120.

Using a combination of the LH and RH free wheels (shown as included in gear 120) and idler sprockets results in clockwise rotation of the axle irrespective of which direction the input lever is moving. The primary drive gear 140 drives the output sprocket 145 which is connected to the differential 160(a/b) by a drive chain, allowing the rear wheels to safely turn corners by moving at different speeds.

Figure 6D:
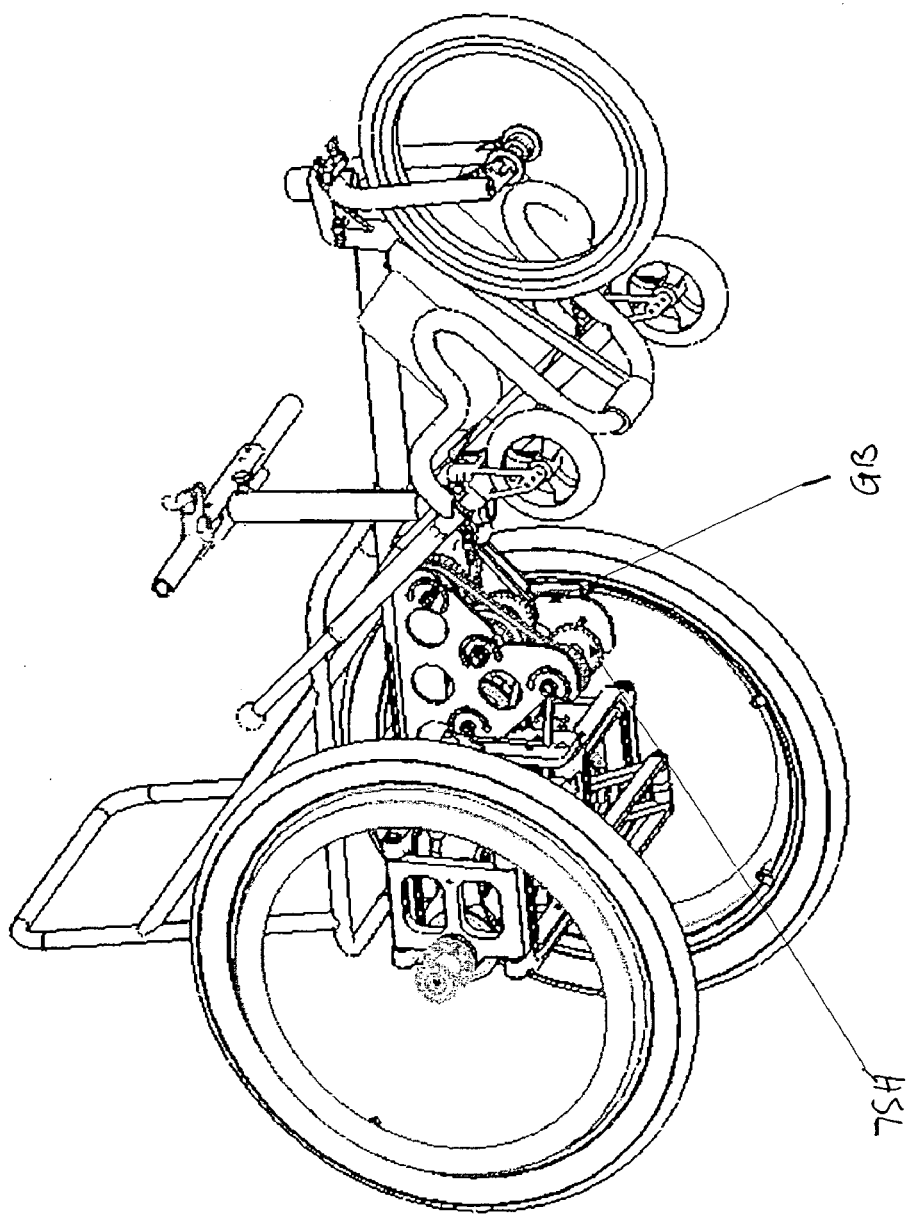
FIG. 6D illustrates the operation of the propulsion system in a first embodiment.

FIG. 6D shows the propulsion system in operation, and also shows that particular embodiments of the hand-propelled vehicle may take advantage of the use of standard bicycle parts by using gearing which emulates that of cycling. In the embodiment shown in FIG. 6D, a 7-speed hub is provided for incremental and variable power and speed to the rear wheels.

The gear box translates the reciprocal (back and forth) motion of the propulsion lever into rotational (cyclical) for forward momentum.

Figure 7A:
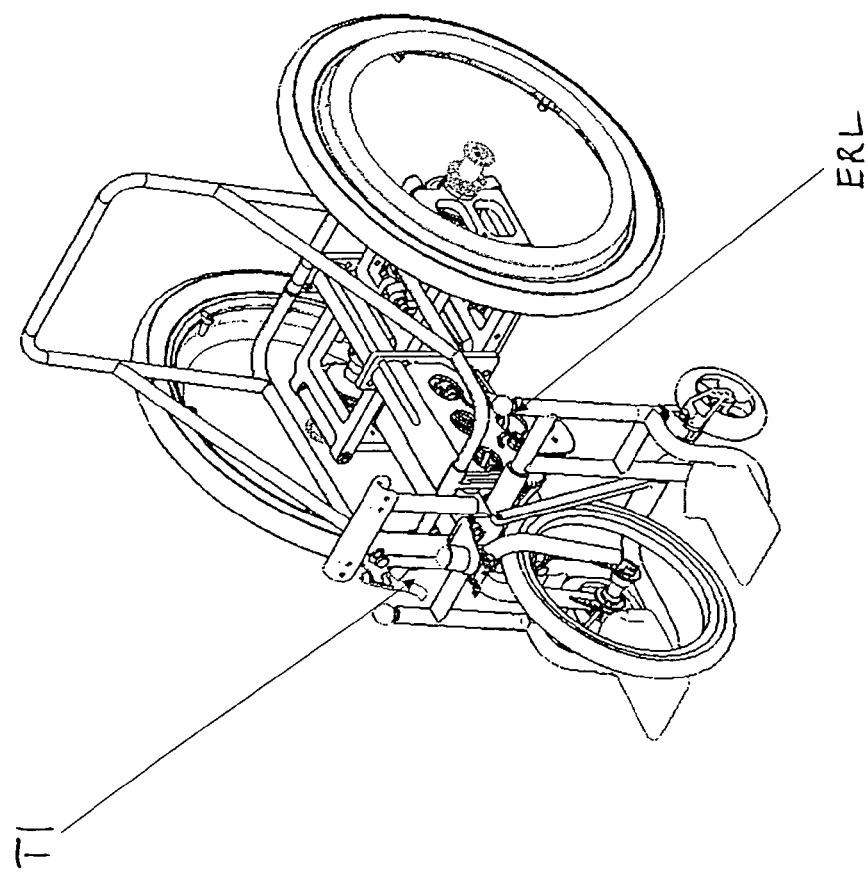
FIG. 7A illustrates an embodiment of the hand-propelled vehicle in transition before extension.
Figure 7B:
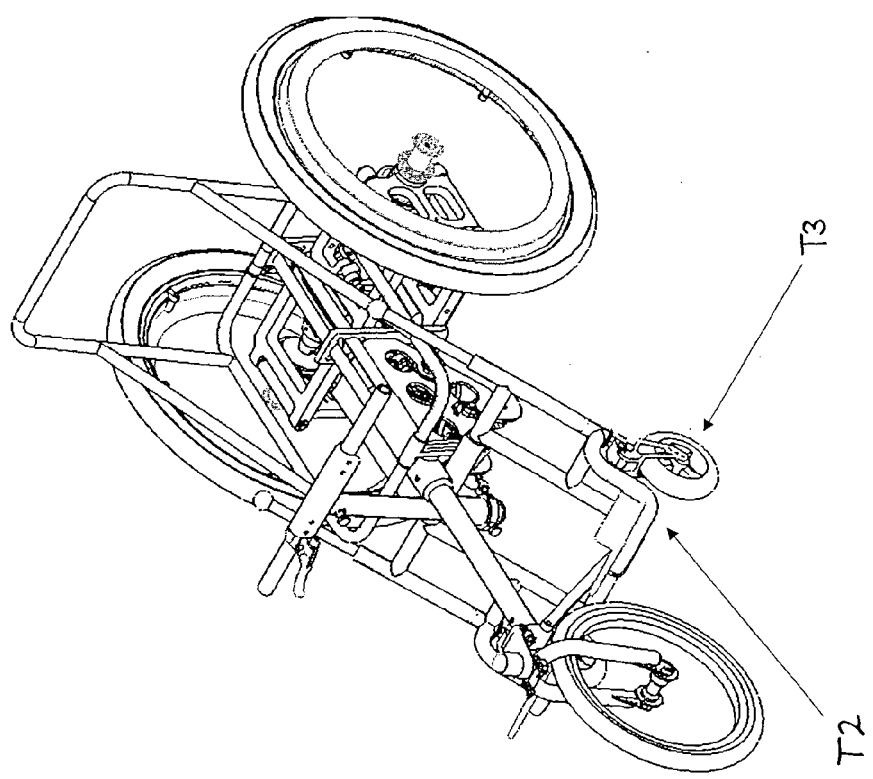
FIG. 7B illustrates an embodiment of the hand-propelled vehicle in transition to extension mode.

FIGS. 7A and B show the hand-propelled vehicle being converted from retracted mode (7A) to extendible mode (7B). As shown in FIG. 7A the handle bars fold down and the propulsion lowers into the stowed position when not in use (periscope style) facilitating ease of transfer at chair height T1. Also shown in FIG. 7A, the extending/retracting levers ERL used to raise and lower foot rests and simultaneously deploy the fifth wheel when converting to and from cycle mode. As shown in FIG. 7B, foot and leg rests automatically raise with the jockey wheels as part of the mechanism which deploys (extends) the fifth wheel (see T2). Also shown in FIG. 7B is that the jockey wheels are used in the wheelchair (retracted) mode, facilitating 360 degree turns on the spot (see T3).

Figure 8A:
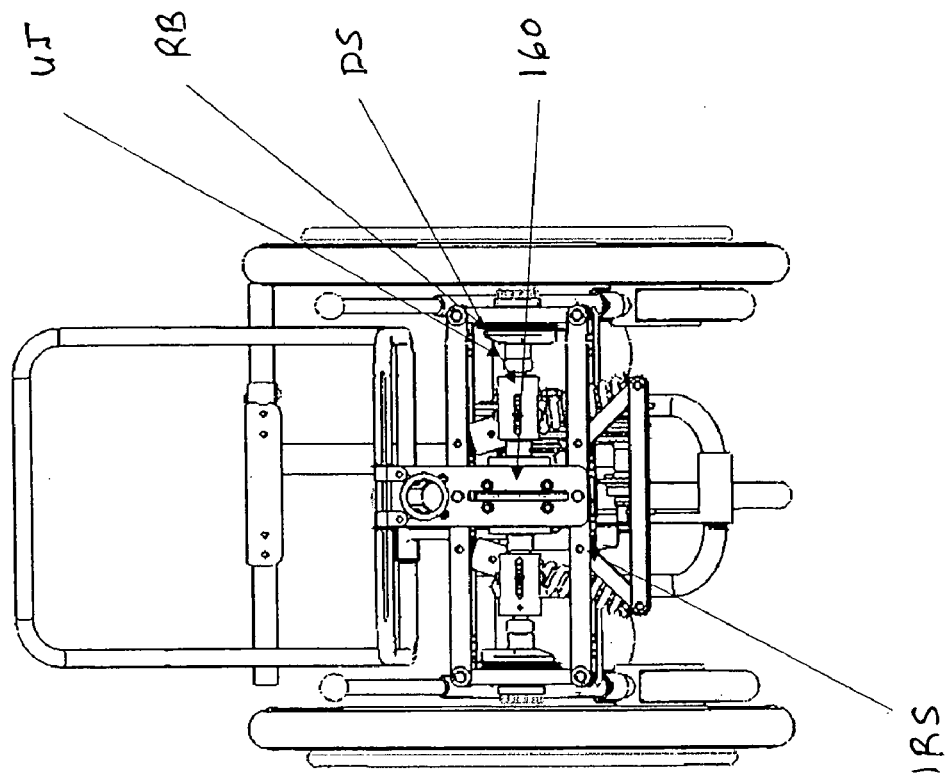
FIG. 8A illustrates features of the suspension system of an embodiment of the hand-propelled vehicle from a rear view.
Figure 8B:
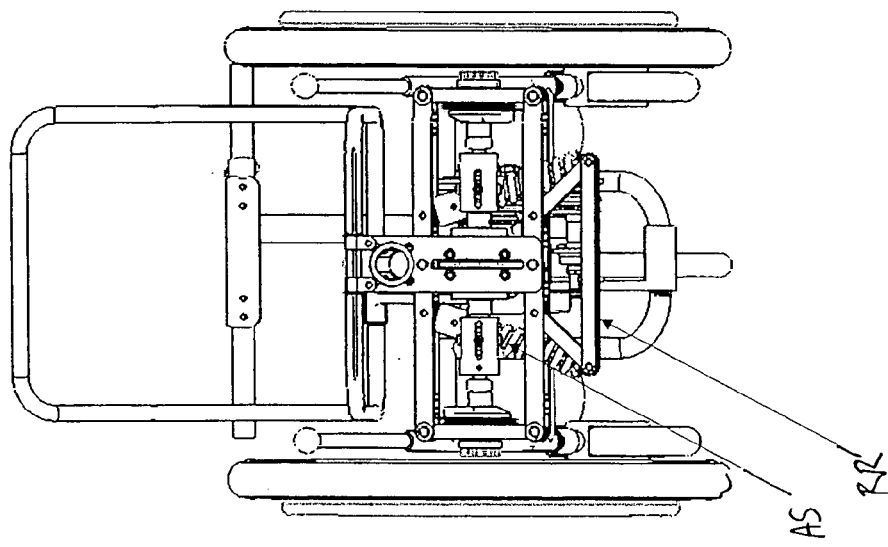
FIG. 8B illustrates optional features of the suspension system of a first embodiment.
Figure 8C:
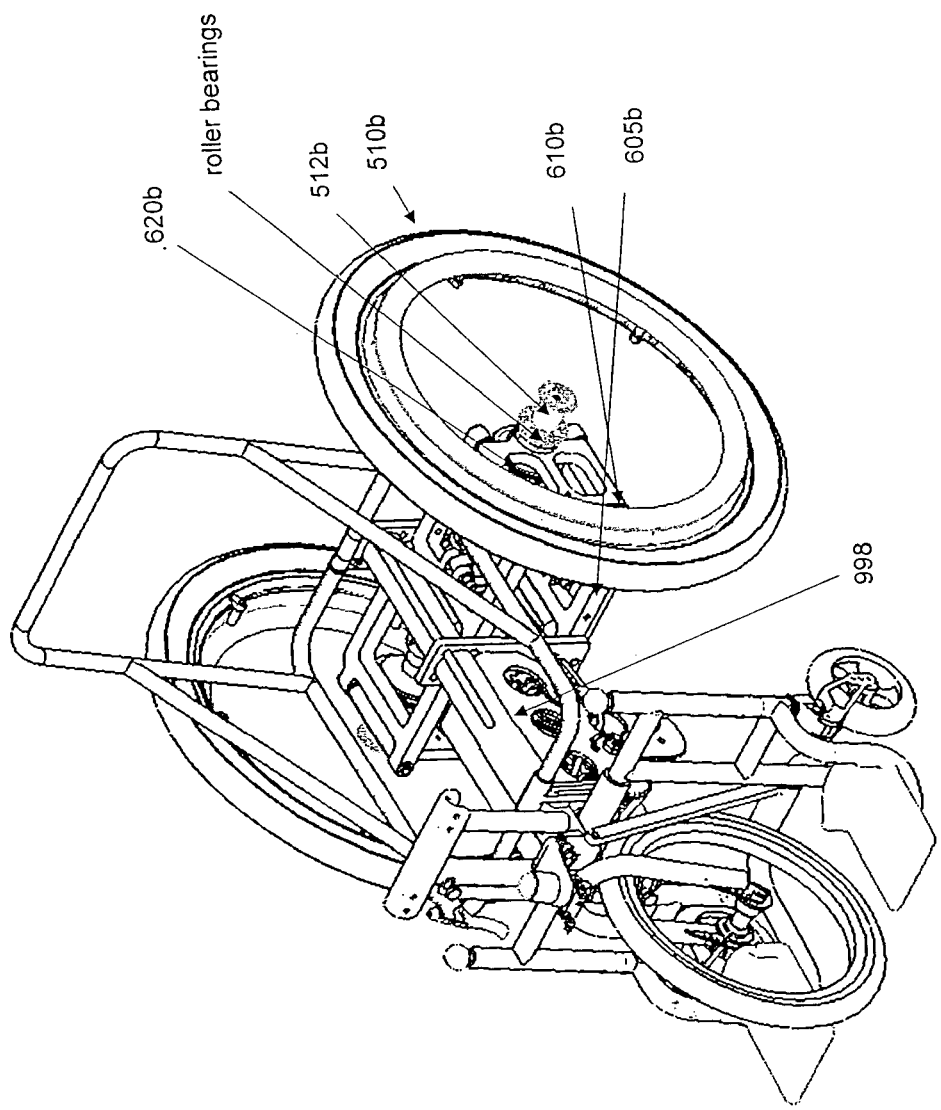
FIG. 8C illustrates the features of the suspension system from a front angled view.
Figure 8D:
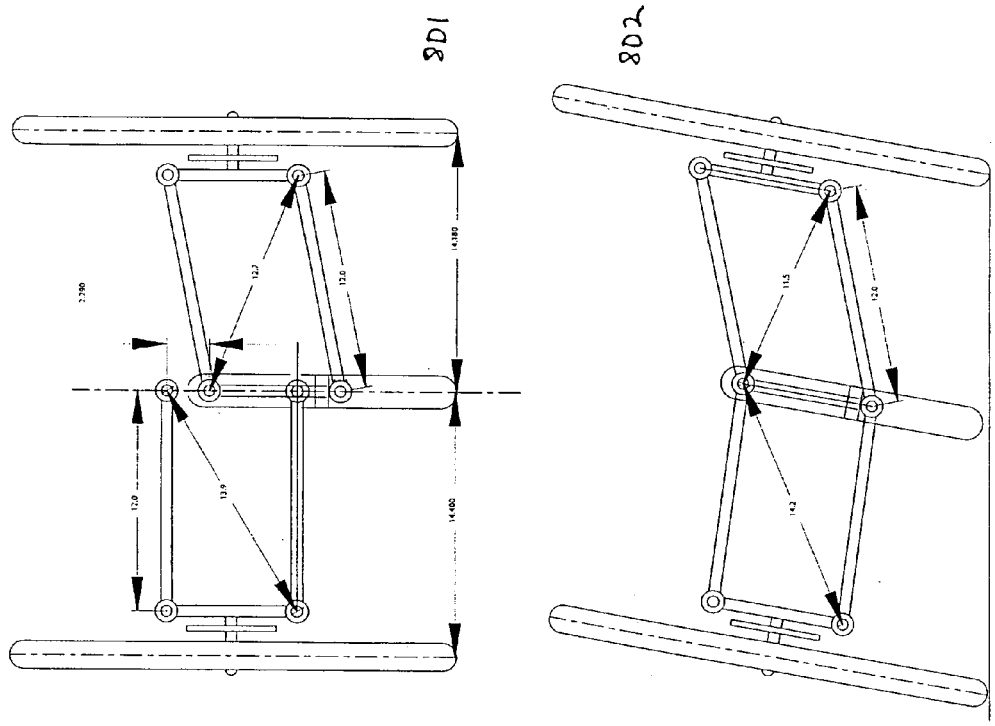
FIG. 8D, illustrates the principle of the tilting independent suspension for each wheel in a sample embodiment.

FIGS. 8A-C shows features of the suspension and support system from the rear view of a first embodiment, including independent rear suspension IRS, differential gearing (see FIGS. 9A/B) 160 for providing power simultaneously and independently and automatically to each of the rear wheels as required, independent drive shafts (See FIGS. 9A/B) DS×2 for transmitted power to each rear wheel, and roller brakes RB, that are ×2 and cable operated from the handle bars and double as parking brakes (see FIG. 10). Also shown in FIG. 8A are universal joints UJ, that are ×2 per drive shaft. FIG. 8B illustrates air shocks AS that are included for a smooth ride, and a feature of the suspension that include a unique "rising rate" RR to facilitate "fitting" into corners for reduced center of gravity. Referring now to FIG. 8D, a sample of the tilting independent suspension system for each of the rear wheels 510A/B is shown. FIG. 8D is a schematic of how the suspension system allows the rear wheels 510A/B to "tilt" into corners. A sample right turn is shown in FIG. 8D1, as the sample left turn is shown in FIG. 8D2

Figure 9A:
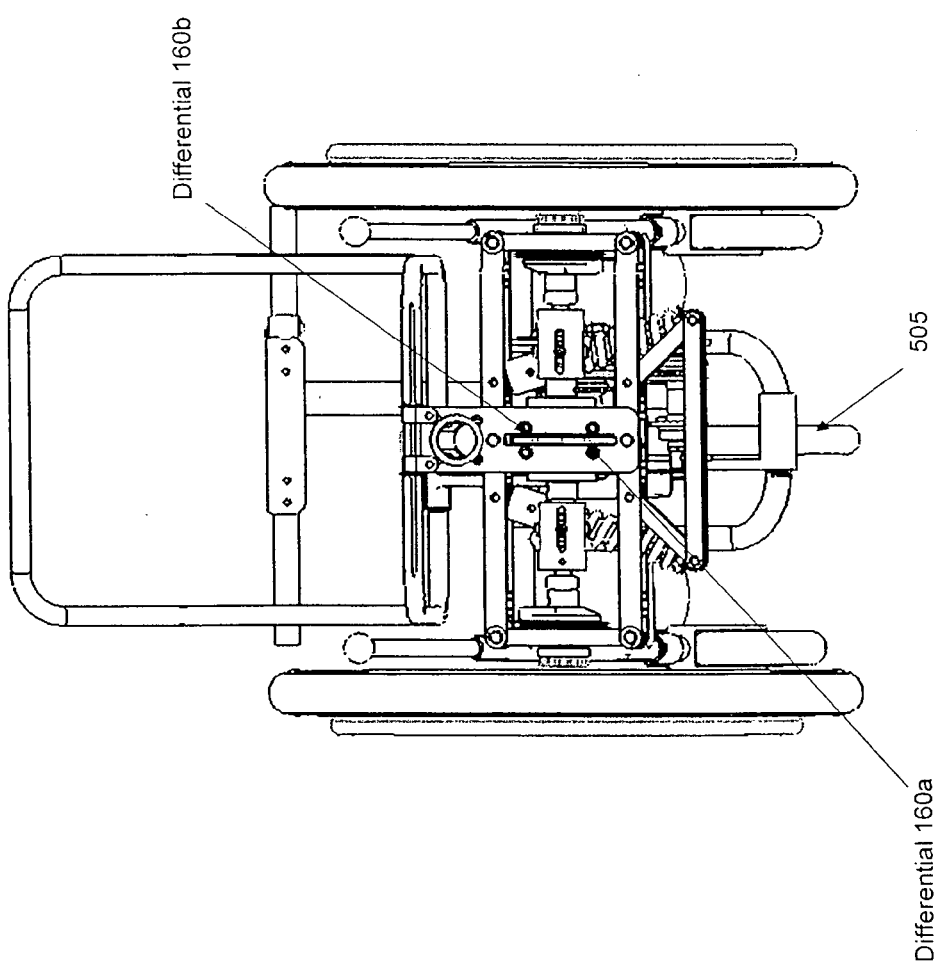
FIG. 9A illustrates the detail of the differential gear and axle features for a first embodiment from a rear view.

FIG. 9A shows the differential gears 160*a/b* that allow the rear wheels of the cycle 510*a/b* to receive power independently.

Figure 9B:
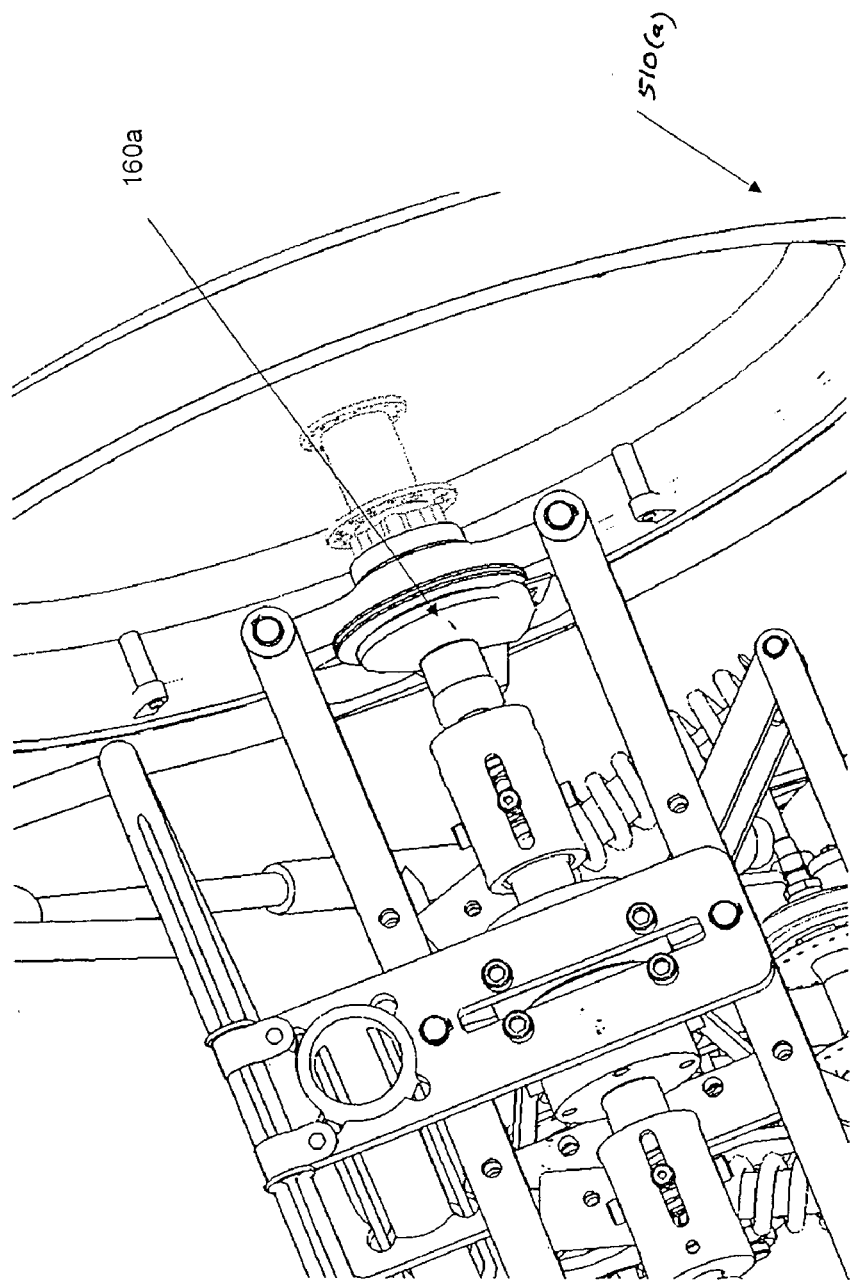
FIG. 9B illustrates the detail of the differential gear and axle features for a first embodiment from a angled view.

FIG. 9*b* illustrates the differential gears 160*a/b* from a close-up view.

FIG. 10 illustrates the sample placement of a brake handle 351 in a first embodiment of the hand-propelled vehicle. The brake lever cable actuation of both rear wheels simultaneously though an "equalizer" (not shown). The gear shift level is on the left-hand side of the handle bar in FIG. 10.

Figure 11A:
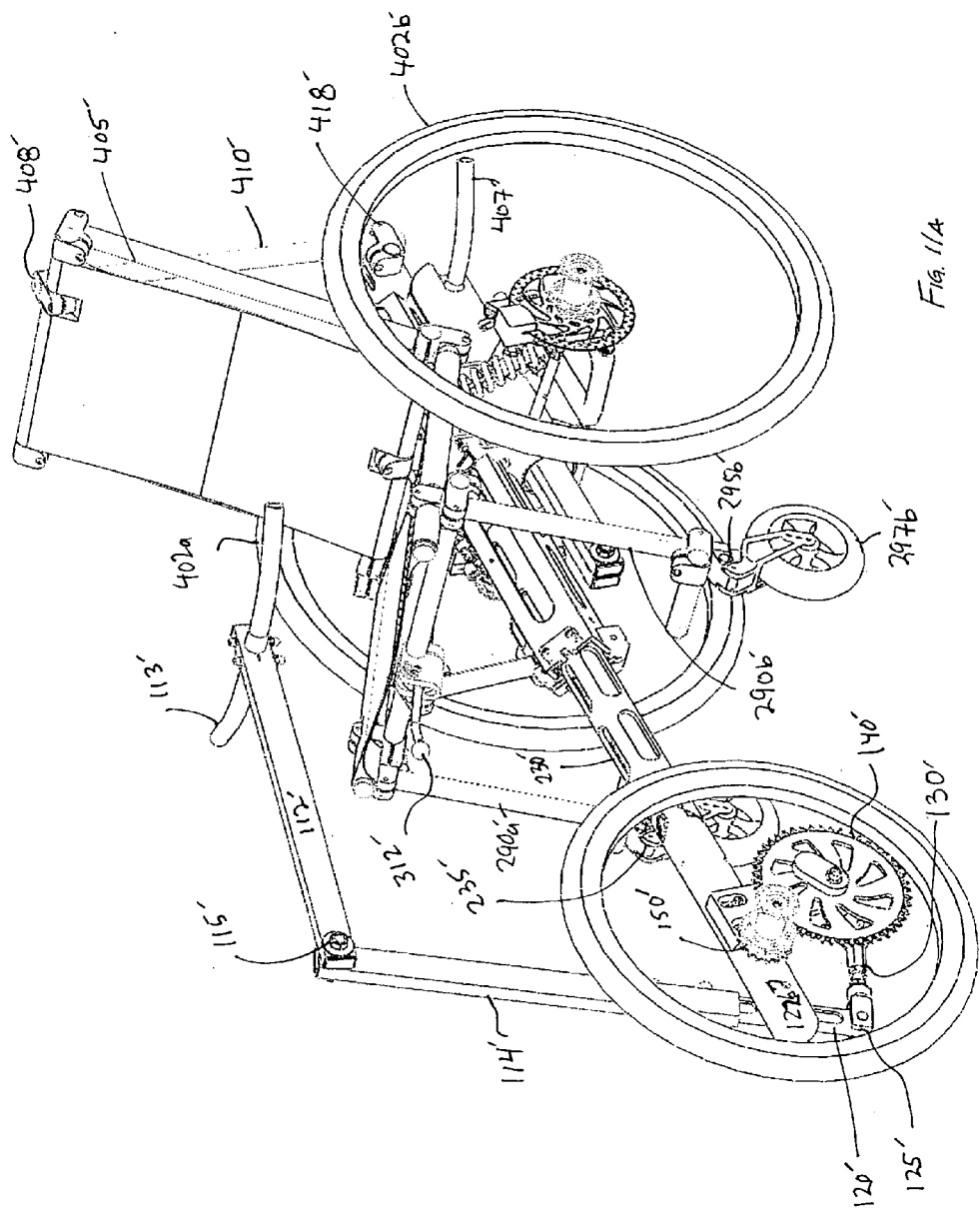
FIG. 11A illustrates a second embodiment of the invention in full extension mode.

FIGS. 11A-14 refer to the alternate embodiment of the invention and the indices should be considered separately from the first embodiment discussed above. Referring now to FIGS. 11A and 11B, two different views of a second embodiment of the inventive convertible wheelchair from front angle and side angles respectively are illustrated. The wheelchair 10' may be broken down into several set of components for the purposes of organization. The first set of components is the propulsion system 100', which include the propulsion handle 110', the propulsion latch 120', the propulsion pivot 125', the engagement arm 130', the primary gear and drive system 140', and the wheel gear 150'.

In the alternate embodiment, the foldable propulsion handle 110' is made up of several components, which include the top portion 112', a bottom or engagement portion 114' and a pivot 115'. The top portion 112' includes a grip 113'. The grip 113' also has features that are part of the clutch system 180' which is discussed below.

In the alternate embodiment, the next set of components shown in FIGS. 11A and 11B is the retractable wheel and storage system 200', which includes the third or propulsion wheel 210' and the retraction and latch mechanism, usually in the form of a pin 255'. Other features of the first embodiment are shown, which include two additional retractable stabilization wheels 297A' and 297B', which are connected to the secondary stabilization bars 290A' and 290B', respectively.

One of the features of the present invention include the main retractable arm 230' that is extended at an angle downward to create a lower center of gravity for the TRIKE™. The third wheel 210' is supported by the main retractable arm 230' (described below) which supports the third wheel at a downward slope (moving towards the front of the wheelchair) and includes a rotation pivot 235' in the arm for steering the wheelchair. The downward slope of the retractable arm 230' has important advantages. First, the chair has a lower center of gravity while being propelled by the rowing motion, which allows for greater control. Second, the downward slope of the retraction arm 230' allows the stabilization wheels 297A/B' to move off of the ground (approximately 2 inches in a first embodiment) while the vehicle is being propelled by the rowing motion, allowing for reduced drag of the stabilization wheels.

The main part of the retraction mechanism 250' is located in a housing or "diamond tube" 251' which is housed underneath the riding platform or seat support 401'. The retraction mechanism 250' allows the main retractable arm 230' to slide into and out of the retractable housing 251', when the retraction pin 255' is removed by the rider. Other features of the retractable arm 230' and housing 251' are discussed below.

In the alternate embodiment, the next set of components include the safety and suspension system 300', which include the braking system 310' and the suspension systems 320'. The braking system 310' includes a braking lever 312', which may be located in several places on the TRIKE™, but is preferably located on the in the center of the TRIKE™, right underneath the seat 405', which allows the rider to pull the brake lever 312' with the force of their weight. In the first embodiment the brake shoes 314A' and 314B' engage a brake disc(s) 316A' and 316B' which are located on the interior of the individual axles 375A' and 375B'.

Figure 12A:
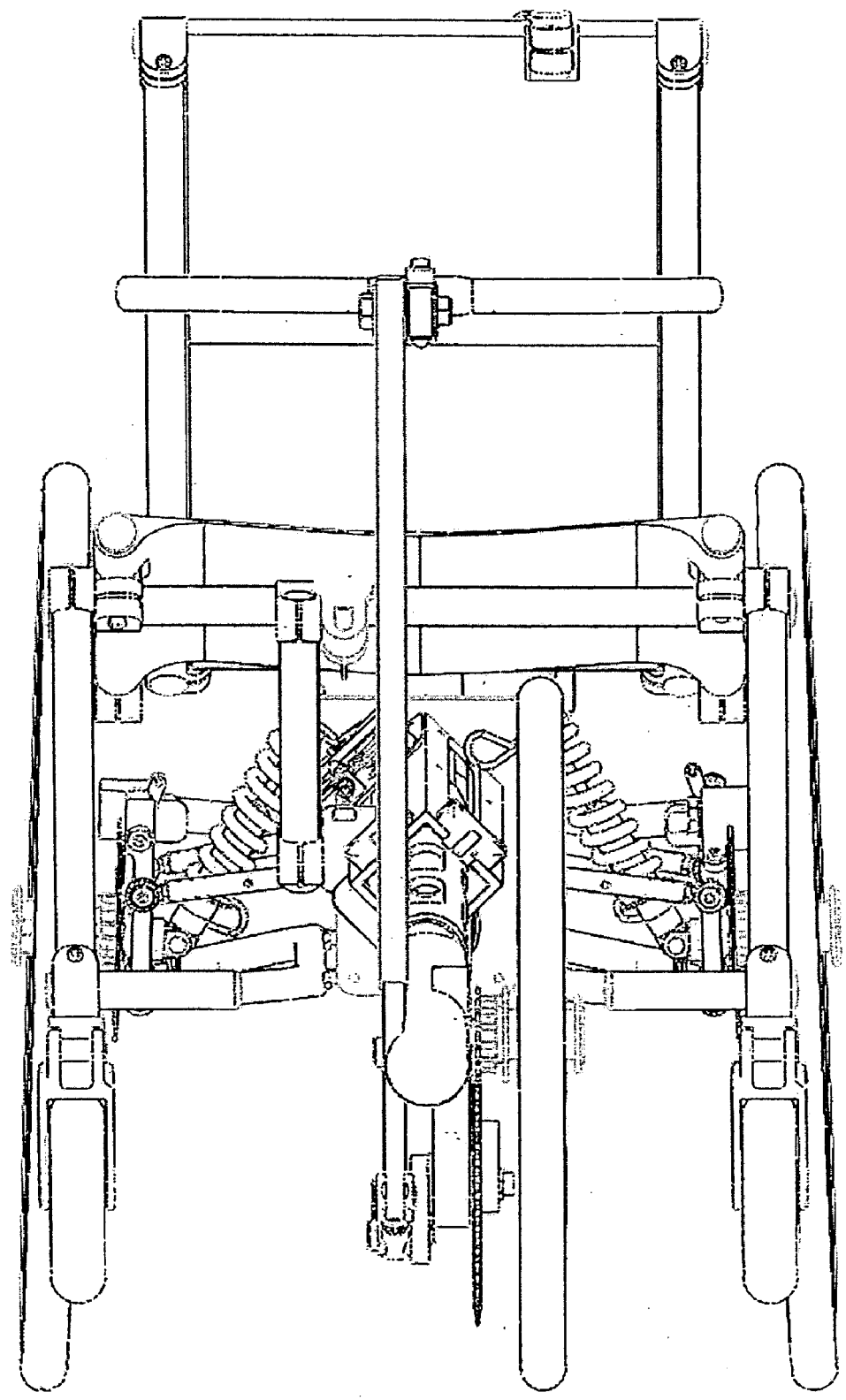
FIG. 12A illustrates the extended second embodiment from a front view.
Figure 12B:
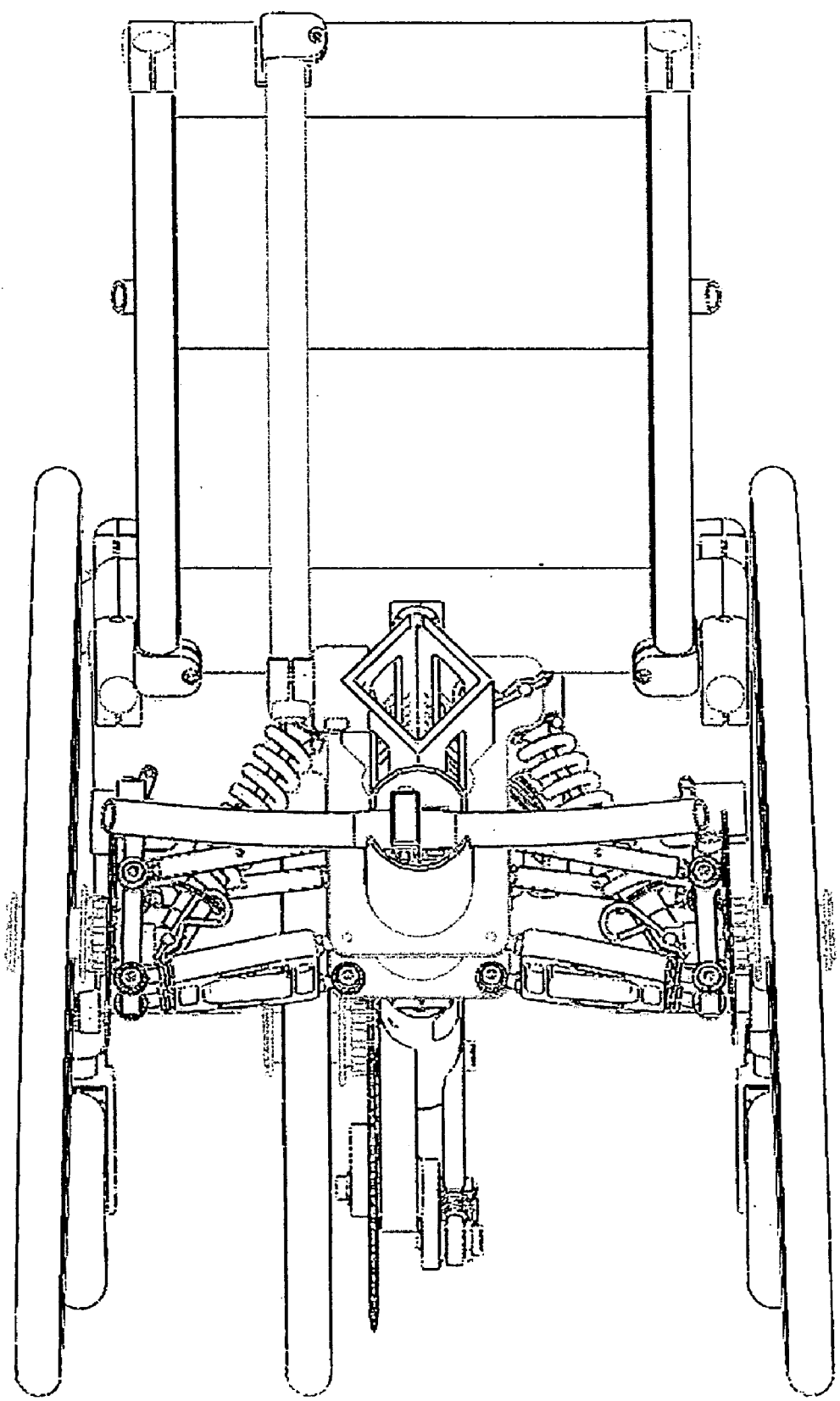
FIG. 12B illustrates the extended second embodiment from a rear view.

Referring now to FIGS. 12A and 12B direct front and rear views of the second embodiment in the extended mode are shown. Other important features of the innovative wheelchair may be seen.

It is important to the second embodiment of the invention that when the retraction arm 230' is extended and the third wheel 210 is engaged that the support wheels 297A and 297B are off the ground approximately two inches. This can be seen more clearly in FIG. 12B as well as FIG. 12A, discussed below. In general the third wheel 210' is slightly off center, to allow the propulsion gears to be activated and used in the center of the TRIKE™. Thus, the user's rowing is more efficient that if the third wheel 210' were located in the center and the propulsion was off center. However, to compensate for the slight off center position of the third wheel, the rear wheels 402A/B can be slight adjusted to compensate for the off-center positioning.

In the propulsion system 100' in the second embodiment, the gears are configured such that the front wheel derives power from both a forward and a return stroke of the propulsion arm 110'.

The lever system as engaged by the rowing motion propulsion arm 110'. In considering the propulsion system 100', the lever (indexes 110' and 120') and gears (see indexes, 130', 140' and 150') ratios may vary from embodiment to embodiment depending on the needs of the end-user, however, in a particular embodiment, given an average riders ability to deliver 50lbs force at a rate of 44 cycles/min (1 push/pull=1 cycle)×4 ft of lever travel/cycle=176 ft/min. This equates to 50×176=880/ft-pounds/min. For conversion to kilowatts we must multiply 880 ft-pound/min by 0.0000226 which =0.2 kilowatts. (200 W). Given a constant output from the rider of 200 W applied to the mechanical advantage of the Trike's propulsion mechanism we have the following result:

Mechanical Advantage is defined as MA = L ÷ E where:-
(L) = load output force; (E) = effort or applied force ($I_1$) = handle length of the lever above the fulcrum($I_2$) = shorter length of the lever below the fulcrum
Using the law of levers ($I_1$) ÷ ($I_2$)  E × $I_1$ =   L × $I_2$
Hence  L ÷ E =   ($I_1$) ÷ ($I_2$)
Trike Propulsion lever or arms (110)  Leverage =   20" ÷ 4"
20" ($I_1$) and 4" (120) ($I_2$)
 MA =   5:1
Example:-  Applied force (E) =   50 lbs
 MA =   5
 Output force L =   50 × 5 = 250 lbs Applying the work rate of 200 W to the alternate Trike propulsion mechanism at a cycle rate of 44/min×the mechanical advantage of 5:1 this yields a constant output sufficient to travel at approx 8 mph (20" wheel Diameter×π (3.14)=62.8" circumference×3 for the gear ratio of Large (140) to small sprocket (150)=188"×44 cycles/min=8,290'/min=690 ft/min=7.85 mph or approx 2× walking speed.).

A clutch system includes a clutch (not shown), is located on the handle 113' and is grip-activated (clutch) or thumb-activated (button) which "pulls" a cable (not shown), located in the interior of the propulsion handle 110', which pulls or lifts a pin (not shown), located at the bottom on the propulsion handle 110' which engages the rocker arm 135' which drives the second or drive lever 120'. The clutch system is also an important safety feature as the rider can choose to engage the clutch when traveling at high speeds to slow the vehicle down with the rowing motion of the propulsion arm 110'.

The drive arm 130' is connected to the propulsion gear 140' through a rotating catch 133'. The details of how propulsion gear 140' may be configured will vary from embodiment depending on the end use requirements of the user. However, in a primary embodiment, the rotating catch' allows the propulsion gear 140' to generate forward motion when the drive lever 120' moves in either direction from the "push" and "pull" rowing motion of the user. In other embodiments of the invention, the clutch may engage or disengage the catch (not shown) that drives the propulsion gear, allowing the user a different type of control provided by the rowing motion of the propulsion arm 110'.

Figure 14:
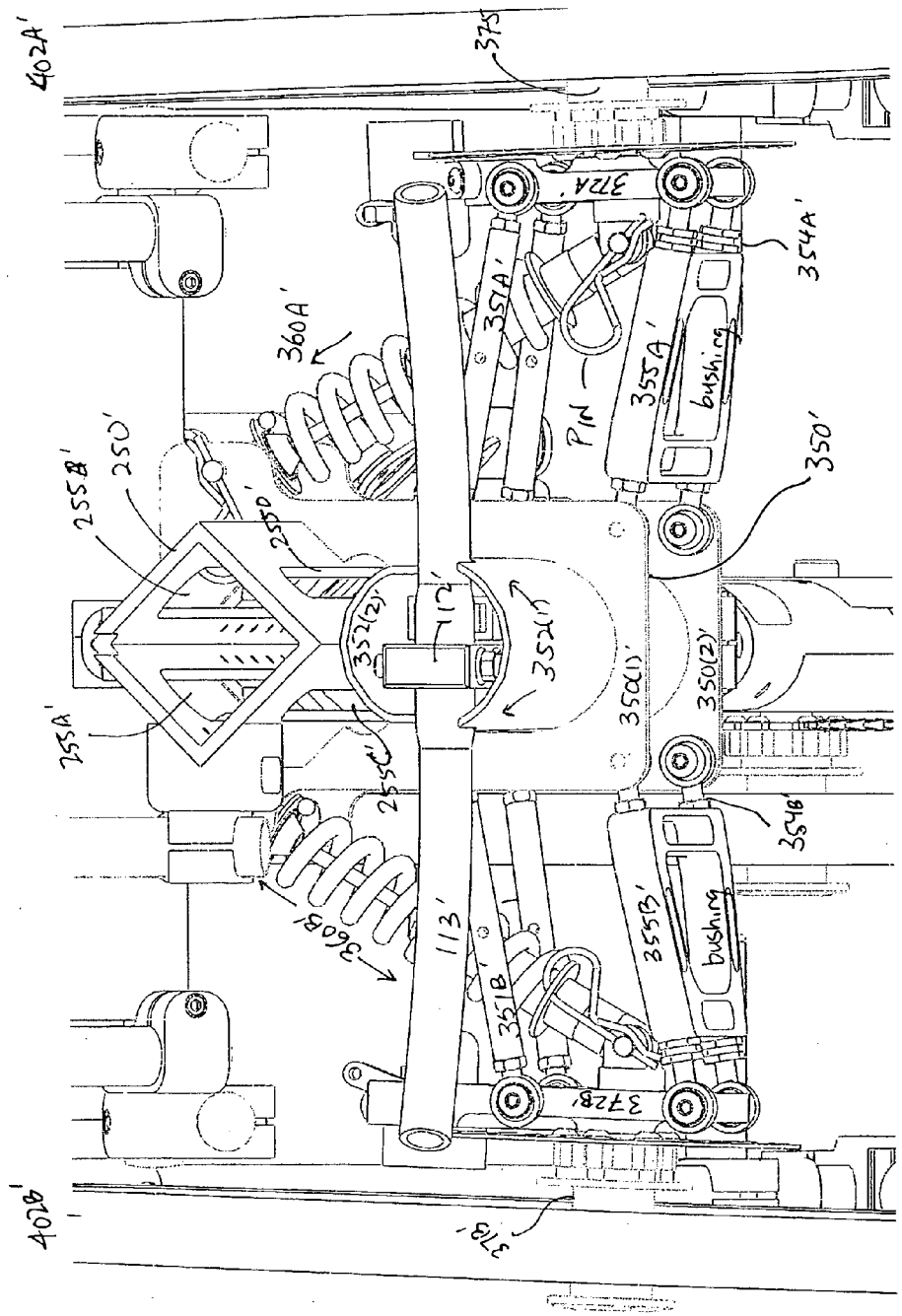
FIG. 14 illustrates detail on the rear suspension of the second embodiment.

The interior of the alternate embodiment TRIKE™ is shown in FIG. 14, and includes a housing 251 of the retractable mechanism 250' and has 4 slots 255A', B', C', D', which in a preferred embodiment that allow the extendible arm 230' to slide back into the housing 251' in the retracted mode. Discussed below, each wheel 402A' and B' has its own axle and suspension system (360A' and B', respectively).

FIG. 14 also shows the two base plates or gussets 350(1)' and 350(2)' support the structures that generally comprise the suspension system for each of the wheels (402A' and B'). These include the shock absorber systems for each wheel 360A' and B', the upper axle suspension or tie rod sets (357A(1)' and (2)' and B(1)' and (2)', respectively), the lower axle suspension or bushes (355A' and B', respectively), which are both attached to the axles support plates 372A' and B', respectively. One of the important features of the innovative wheelchair is that the independent suspension for each rear wheel (402A/B') allows the rear wheels to "tilt" independently into the turns.

Also shown in FIG. 14 is the handle storage 352', in which the propulsion arm 110' can be folded and stored in the interior of the TRIKE™ and underneath the diamond tube 251'. The handle 113' runs horizontally along the back of the wheelchair.

The bushings 355A/B' can be adjusted to compensate for the off-center position of the third wheel 210'. Each bushing 355A/B' has an adjustment arms 354A/B' which allow for fine adjustment of each of the axles 375A/B', respectively. The bushing 355A/B' adjustment is particularly important as the off-center placement of the drive wheel 210' to maintain the centrality of the user's propulsion force(s) requires a very slight adjustment.

In the alternate embodiment, the front part of the retraction arm 230' as it collapses into the retraction housing or diamond tube 251'. The retraction arm 230' slides along small wheels 232(1)', 232(2)' and 232(3)' which are housed inside brackets 233(1)', 233(2)', and 233(3)', respectively.

In the interior of the retraction mechanism 250' and housing 251', housing 251' is generally referred to as the "diamond tube" in a preferred embodiment. The diamond tube 251' has at least two slots 282(1)' and 282(2)' in the rear portion of the tube 251'. The slots 282(1 and 2)' may be on the same side, but in a preferred embodiment, the front slot 282(1)' is located on top of the tube 251' and the rear slot is located on the bottom. When the retraction arm 230' is pushed back into the diamond tube, two or more wheels 253(1)' and 253(2)' attached to the rear of the retraction arm 230', roll along the inside of the tube 251' until they reach the respective slots 282(1)' and 282(2)'. A teeter 285' rotates the front wheel 253(1)' up into the top slot 282(1)' and the rear wheel 253(2)' down into the bottom slot 282(2)', securing the retraction arm 230' into the diamond tube 251'.

Figure 13A:
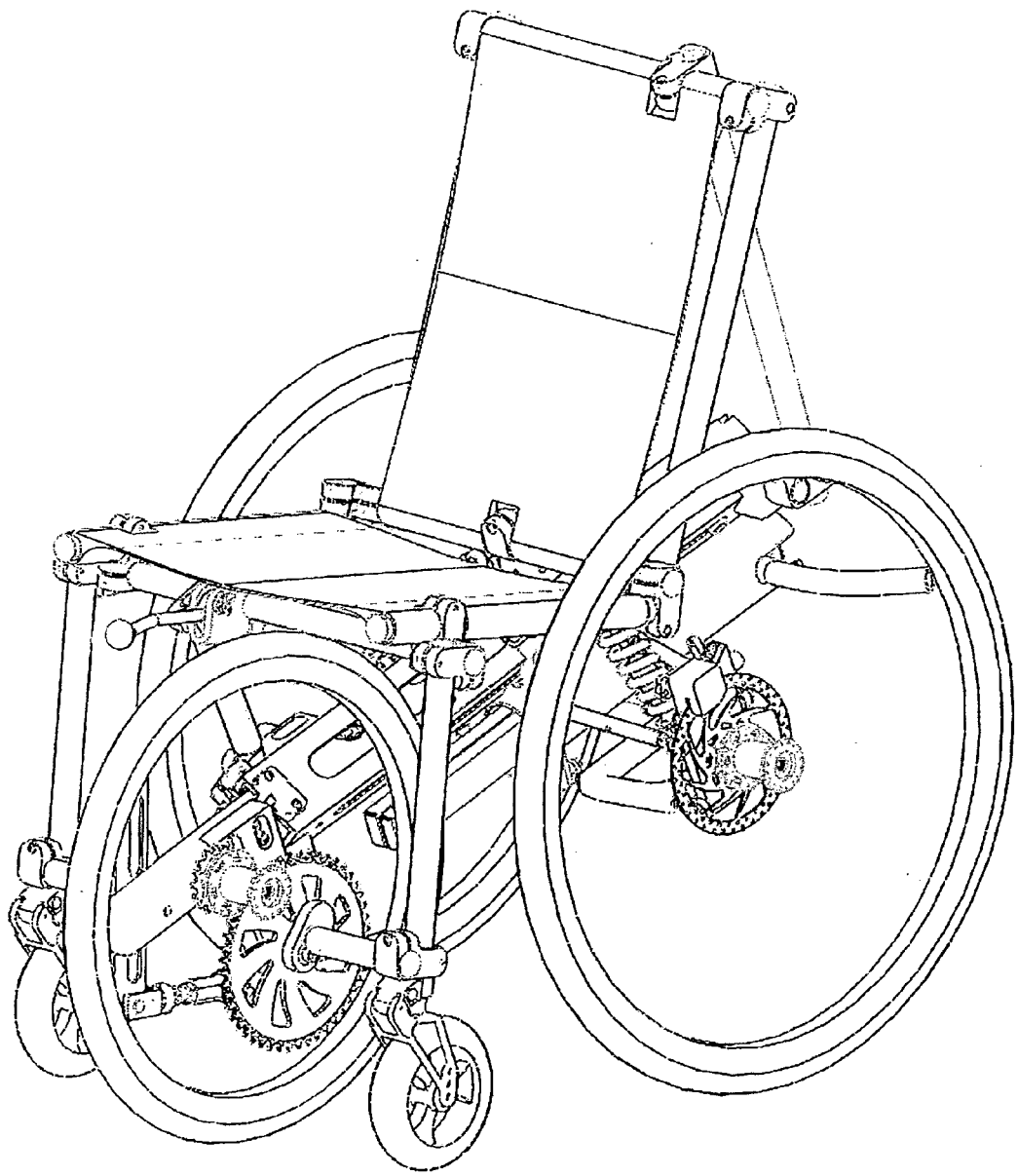
FIG. 13A illustrates the retracted second embodiment from a side-angle view.
Figure 13B:
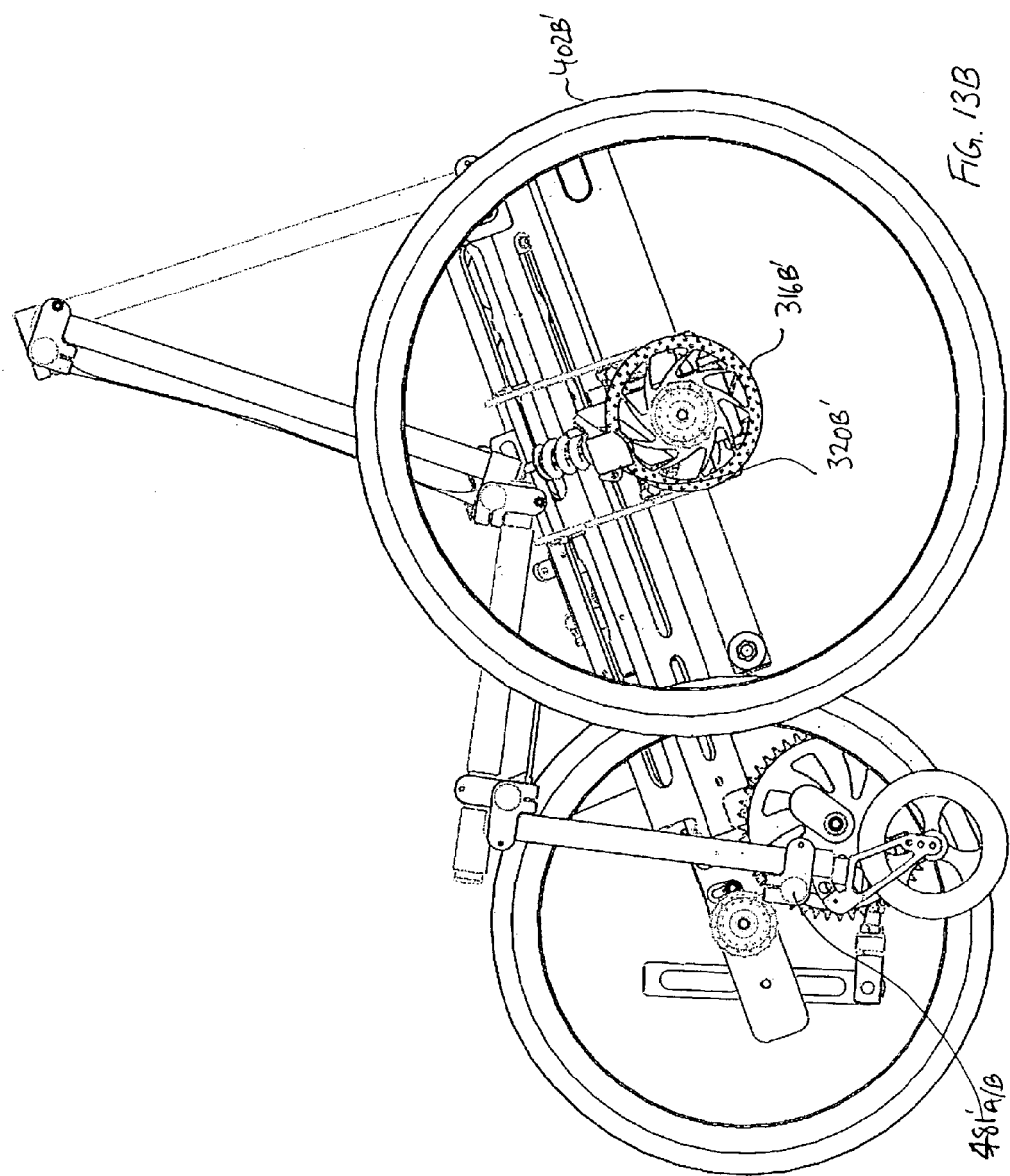
FIG. 13B illustrates the retracted second embodiemtn from a side view.

FIGS. 13A and 13B illustrate the alternate embodiment of invention in retraction mode from angle and side views respectively. An important feature of the present invention is that the third wheel 210' is lifted off the ground in the retracted mode and the two support wheels 297A' and B' touch the ground. In general the third wheel is lifted about 2 inches to provide easy turning and clearance, as the front edge of the third wheel 210' generally only protrudes a couple of inches beyond the users' feet, which rest on the heel plates 481(A)' and 481(B)'.

The braking components of the alternate embodiment include a braking cable (not shown) is connected to the brake lever (not shown, 312' in FIG. 11A) at one end, and to the equalizer plate EP at the other end. The equalizer plate EP is located on the top of the diamond tube (not labeled). The braking cable pulls the equalizer plate EP which, in turn, pulls the cables (not shown) that are each connected to the respective brake shoes (not shown, 316A' and B', in FIG. 11B). The braking components, such as the cable, the shoes, and the discs, may be standard high-performance bicycle components, which reduce the cost of the vehicle.

The engagement portion of the propulsion handle 114' slides over the propulsion latch 120', such that the user can drive the vehicle by moving the top portion 112' of the handle back and forth in a "rowing motion." In various embodiments the "rowing motion" can be adjusted to the needs of the wheelchair users, but is generally a back and forth motion (discussed below) and extends a total of approximately 60 degrees in a preferred embodiment. This includes 30 degrees towards the user from the "normal" z-axis position and 30 degrees away from the user (See FIG. 11B). The engagement portion 114' may also include an optional pin or latch 117' which locks the propulsion handle 110' into place over the engagement arm 12'0, preventing slipping or the propulsion handle 110' from getting stuck on the engagement arm 120' during strenuous use of the TRIKE™.

The front wheel gear and axle 150' may have optional multiple gears (not shown), such as would be desirable for various activities in the chair, such as racing (high gear ratio), climbing hills (low gear ratio) or city use (medium gear ratio).

An optional clutch system 170' is present in an alternate embodiment, through a hand-pulled lever or button 182' and located in the handle 113'.

We claim:
1. A hand-propelled vehicle comprising:
   a frame with a telescoping support bar, said bar supporting a rider seat and wheel supports for five wheels, including two front jockey wheels, two rear wheels and a retractable front wheel;
   a rowing-motion propulsion system including a t-bar lever connected to an elbow, said t-bar moving in forward and reverse direction, said elbow driving a gear wheel when said t-bar is moved either forward or backward;
   said t-bar lever pivoting at a point on said telescoping support bar; said gear wheel driving said two back wheels;
   said t-bar being rotatable;
   wherein when said telescoping support bar is extended, said retractable front wheel is touching a road surface, and two front jockey wheels are lifted off of said surface.

2. The hand-propelled vehicle as recited in claim 1, wherein when said telescoping support bar is retracted, said retractable front wheel is lifted off of said road surface and said front jockey wheel are lowered onto said surface.

3. The hand-propelled vehicle as recited in claim 1, wherein said frame includes an h-shaped jockey frame, wherein when said h-shaped jockey frame includes an extension that lowers said retractable wheel onto said surface, when said extension is pushed.

4. The hand-propelled vehicle as recited in claim 1, wherein said gear wheel is connected to a differential gear that is operatively connected to each of said two rear wheels.

5. The hand-propelled vehicle as recited in claim 1, wherein a brake lever is located on said handle bars, said brake lever connected to a brake cable for operating a brake, said brake connected to brake means for braking said rear wheel.

6. The hand-propelled vehicle as recited in claim 1, wherein said propulsion applies a constant force to both rear wheels simultaneously, allowing for one or the other to rotate faster as required.

7. A hand-propelled vehicle, including:
   a frame supporting a front wheel and two rear wheels;
   a drive propulsion system in which a lever configured to move front to back to front driving an elbow across a fulcrum, said elbow moving a first gear that moves in rotation in only one direction and drives a second gear in one direction when lever is either moved forward or backward;
   said second gear connected to a drive gear;
   said drive gear propelling said vehicle forward
   wherein said front wheel is supported by a retractable telescoping bar, wherein:
   said telescoping bar includes a sliding inner portion and a stationary outer portion,
   configured such that when said inner portion is at least partially retracted within said outer portion, said front wheel is lifted off the surface of the ground, wherein said inner portion may be locked into said extended or retractable positions.

8. The hand-propelled vehicle as recited in claim 7, further including two rotatable jockey wheels, said rotatable jockey wheels each connected to a frame, said rotatable jockey wheels configured to lower onto said surface when said inner portion of said telescoping bar is retracted, and raised off of said surface when said telescoping bar is extended.

9. The hand-propelled vehicle as recited in claim 8, further including a fork supporting said front wheel, the top of said fork ending in a steering knuckle, said front wheel rotated by a steering lever which is rotatable, and said lever connected to a cable that rotates said front wheel in order to steer said hand-propelled vehicle.

10. The hand-propelled vehicle as recited in claim 7, further including a braking system, said braking system including a brake handle on said lever, said brake handle operating a brake cable, for operating a brake for braking said rear wheels.

11. A hand-propelled vehicle comprising:
    a frame with a telescoping support bar, said bar supporting a rider seat and wheel supports for five wheels, including two front jockey wheels, two rear wheels and a retractable front wheel;
    a rowing-motion propulsion system including a t-bar lever connected to an elbow, said t-bar moving in forward and reverse direction, said elbow driving a gear wheel when said t-bar is moved either forward or backward;
    said t-bar lever pivoting at a point on said telescoping support bar; said gear wheel driving said two back wheels;
    said t-bar being rotatable and connected to a front wheel through a steering mechanism;
    wherein when said telescoping support bar is extended, said retractable front wheel is touching a road surface, and two front jockey wheels are lifted off of said surface.

12. The five-wheeled vehicle as recited in claim 11, wherein differential power is equally distributed to the rear wheels through a constant force to said of both rear wheels simultaneously.

13. The five-wheeled vehicle as recited in claim 12, wherein said differential power to said rear wheels allowing for one or the other to rotate faster as required.

14. A five-wheeled, hand-propelled cycle, including:
    a telescoping frame connecting to a rear wheel support, supporting two rear wheels, and a front wheel frame, supporting a front wheel, said front wheel smaller than said two rear wheels;
    said telescoping frame, extending slightly downward towards a roadway surface, as extends from said rear wheel support to said front wheel frame; said telescoping frame supporting a frame for supporting a set of jockey wheels;
    a propulsion system, including a rotatable t-bar connected to a bi-directional mechanical power converter, and pivotably connected to said telescoping frame;
    wherein forward power is applied to said rear wheels when said rotatable t-bar is either pivoted forward or backward.

15. The five-wheeled vehicle as recited in claim 14, wherein when said front wheel is touching said road surface, said jockey wheels are above said road surface.

16. The five-wheeled vehicle as recited in claim 14, wherein said t-bar is capable of steering said front wheel through a cable connected to a steering knuckle on said front wheel.

17. The five-wheeled vehicle as recited in claim 14, wherein a reciprocal motion of said t-bar is converted to a rotary motion in said bi-directional mechanical power conversion.

18. The five-wheeled vehicle as recited in claim 14, wherein said bi-directional mechanical power converter includes a differential gear being for allowing a first of said rear wheels to rotate faster than a second of said rear wheels.

* * * * *